US007690033B2

(12) United States Patent
Pernia

(10) Patent No.: US 7,690,033 B2
(45) Date of Patent: Mar. 30, 2010

(54) ELECTRONIC COMPUTER SYSTEM SECURED FROM UNAUTHORIZED ACCESS TO AND MANIPULATION OF DATA

(75) Inventor: Marcos Benjamine Pernia, Redwood City, CA (US)

(73) Assignee: Exobox Technologies Corp., Houston, TX (US)

( * ) Notice: Subject to any disclaimer, the term of this patent is extended or adjusted under 35 U.S.C. 154(b) by 135 days.

(21) Appl. No.: 11/237,035

(22) Filed: Sep. 27, 2005

(65) Prior Publication Data

US 2006/0069692 A1 Mar. 30, 2006

Related U.S. Application Data

(60) Provisional application No. 60/613,768, filed on Sep. 28, 2004, provisional application No. 60/675,613, filed on Apr. 28, 2005.

(51) Int. Cl.
G06F 21/02 (2006.01)
G06F 21/00 (2006.01)
G06F 21/06 (2006.01)
G06F 21/22 (2006.01)

(52) U.S. Cl. .............................. 726/16; 726/2; 726/17; 713/189; 713/190; 713/191; 713/193; 709/223; 709/225

(58) Field of Classification Search ................. 726/16, 726/2, 17
See application file for complete search history.

(56) References Cited

U.S. PATENT DOCUMENTS 5,805,809 A 9/1998 Singh et al.

| 5,925,126 A | 7/1999 | Hsieh |
| 5,974,143 A * | 10/1999 | Davis ........................ 713/189 |
| 6,026,402 A | 2/2000 | Vossen et al. |
| 6,397,242 B1 | 5/2002 | Devine et al. |
| 6,496,847 B1 | 12/2002 | Bugnion et al. |

(Continued)

FOREIGN PATENT DOCUMENTS

| GB | 2 404 262 A | 1/2005 |
| WO | WO 192981 A2 | 12/2001 |
| WO | WO 02/093369 A1 | 11/2002 |
| WO | WO 2005/043360 A1 | 5/2005 |

OTHER PUBLICATIONS

PCT International Search Report and Written Opinion dated Nov. 6, 2007 (15 pages).

(Continued)

*Primary Examiner*—Syed A. Zia
(74) *Attorney, Agent, or Firm*—Osha • Liang LLP

(57) ABSTRACT

In general, the invention relates to a method for securing a computer system. The method includes monitoring an operating system in the computer system and trapping, in response to the monitoring, a process system call where the process system call originated in a host executing in the computer system. Responsive to the trapping, an isolated user environment (IUE) is created in the computer system. Creating the IUE includes allocating memory and persistent storage for the IUE. In addition, the IUE includes a file system filter driver (FSFD) configured to redirect Input/Output (I/O) calls originating from the IUE to the persistent storage, and a network interface/NDIS hook component configured to control network traffic originating from the IUE and destined for the IUE. The method further includes, after creating the IUE, loading the process system call into the IUE and executing the process system call in the IUE.

15 Claims, 22 Drawing Sheets

U.S. PATENT DOCUMENTS

| | | | |
|---|---|---|---|
| 6,594,686 B1* | 7/2003 | Edwards et al. | 709/203 |
| 6,658,571 B1 | 12/2003 | O'Brien et al. | |
| 6,662,186 B1* | 12/2003 | Esquibel et al. | 707/101 |
| 6,678,825 B1* | 1/2004 | Ellison et al. | 726/17 |
| 6,820,146 B2 | 11/2004 | Cox | |
| 6,823,460 B1 | 11/2004 | Hollander et al. | |
| 6,922,774 B2 | 7/2005 | Meushaw et al. | |
| 6,938,021 B2* | 8/2005 | Shear et al. | 705/67 |
| 6,941,470 B1 | 9/2005 | Jooste | |
| 7,093,239 B1* | 8/2006 | van der Made | 717/135 |
| 7,380,278 B2* | 5/2008 | Ellison et al. | 726/26 |
| 7,398,532 B1* | 7/2008 | Barber et al. | 719/328 |
| 7,401,230 B2* | 7/2008 | Campbell et al. | 713/190 |
| 7,475,423 B2* | 1/2009 | Jooste | 726/4 |
| 7,496,768 B2* | 2/2009 | Roberts et al. | 713/193 |
| 2002/0056076 A1* | 5/2002 | Made | 717/129 |
| 2002/0066021 A1* | 5/2002 | Chien et al. | 713/200 |
| 2003/0159070 A1 | 8/2003 | Mayer et al. | |
| 2003/0212902 A1* | 11/2003 | van der Made | 713/200 |
| 2004/0034794 A1 | 2/2004 | Mayer et al. | |
| 2004/0083366 A1* | 4/2004 | Nachenberg et al. | 713/170 |
| 2004/0111578 A1* | 6/2004 | Goodman et al. | 711/163 |
| 2004/0172544 A1* | 9/2004 | Luo et al. | 713/189 |
| 2004/0172574 A1* | 9/2004 | Wing et al. | 714/4 |
| 2004/0243810 A1* | 12/2004 | Rindborg et al. | 713/176 |
| 2004/0255179 A1 | 12/2004 | Mayer | |
| 2005/0033969 A1* | 2/2005 | Kiiveri et al. | 713/189 |
| 2005/0120242 A1 | 6/2005 | Mayer et al. | |
| 2005/0149726 A1* | 7/2005 | Joshi et al. | 713/164 |
| 2005/0223220 A1* | 10/2005 | Campbell et al. | 713/164 |
| 2005/0257265 A1 | 11/2005 | Cook et al. | |
| 2005/0278533 A1 | 12/2005 | Mayer | |
| 2006/0075381 A1 | 4/2006 | Laborczfalvi et al. | |
| 2006/0200680 A1* | 9/2006 | Ellison et al. | 713/190 |
| 2007/0128899 A1 | 6/2007 | Mayer | |

OTHER PUBLICATIONS

Liang, Z. et al.; "Isolated Program Execution: An Application Transparent Approach for Executing Untrusted Programs"; Proceedings of the 19th Annual Computer Security Applications Conference (ACSAC 2003); IEEE 2003; (10 pages).

* cited by examiner

ELECTRONIC COMPUTER SYSTEM SECURED FROM UNAUTHORIZED ACCESS TO AND MANIPULATION OF DATA

The present application claims the benefit of prior filed U.S. Provisional Applications Ser. No. 60/613,768 filed 28 Sep. 2004 and Ser. No. 60/675,613 filed 28 Apr. 2005, to which the present application is a regular U.S. national application, and which prior applications are incorporated herein by reference.

FIELD OF THE INVENTION

The present invention is in the field of support for electrical computers and digital processing systems. More specifically, the present invention relates to security software and processes for protecting a computer system's hardware, software and data from malicious caused destruction, unauthorized modification or unauthorized disclosure.

BACKGROUND OF THE INVENTION

As the online community grows with the development of high bandwidth, high speed, and high availability connectivity to the public internet, we are seeing an ever increasing proliferation of malicious content and identity/data theft and destruction, perpetrated right in our own home and office computers. Malignant and poisonous web content administered through 'data mining' tools, 'Add-Ware' content, activeX, java script, misleading download queries, Trojan content and virus infected data is responsible for extraordinary, quantifiable, monetary losses to the enterprise every year. There is no measure, however, for the loss off privacy, intimate data and criminal violations these intrusions prey upon our families. Passive, after 'the fact', behindhand screening for Trojan and virus content, such as that provided by modern virus scanning software, has proven itself an inadequate bastion of defense to the cyber theft and data corruption mechanisms rampant in the global cyberspace. The computer security industry has made attempts to address these failings by implementing solutions such as execution protection products that only allow the execution of 'White-listed' applications on any given computer; but such products require constant centralized administration and customization to fit within a divers enterprise community, and are unreasonable solutions for home users due to their management needs and lack of transparency. Though restricting execution can greatly improve the protection of local computer data, a more flexible solution is to virtualize execution in an isolated environment. This methodology has been proven by software implemented virtual machines such as those presented by VMWare©. However, such solutions are not practical, nor were they designed for, implementation as computer security software. Such solutions require the full installation of a secondary operating system within each virtual environment. Implementing such environments requires a higher level of computer understanding than the average user and presents management/administration and storage complications to implementations across an enterprise environment. Even solutions as common to modern computer environments as advanced statefull firewall protection, host security, and access control management is beyond the average computer owner, let alone the peers and loved ones sharing their computer space. Microsoft's Windows architecture does not provide inherent user or group isolation robust enough to protect low privileged users from the actions of malicious code should it find its way onto their computer, nor the proliferation of damage or theft throughout all the computer's user and administrator space. Current third party solutions have proven themselves inadequate to protect a computer from the transgressions of its operators or malicious attack. This begs the questions, is it possible to split a Windows computer into secure virtual environments with as much isolation as possible between each one, looking like individual computers without the cumbersome implementation of classic virtual machine environments? To isolate disk space, virtualize execution, make user data inaccessible and unreadable to other users; yet share some/most/all common tasks (monitoring, backup, ups, hardware configuration and libraries etc) and still allow the individual evolution of each virtual environment? Can this be done transparently, unobtrusively?

SUMMARY OF THE INVENTION

The present invention is software for use with a PC-type computer, either standing alone or connected to a network. The present inventive software, when used in conjunction with a typical PC-type computer, prevents the unauthorized export of data from the computer, corruption/loss of data due to malware or local action. This protection from the unauthorized export of data is accomplished by running the present Isolated/Secure User Environment Software (IUE/SUEZ) as a process component of the computer system. The SUEZ application provides a bubble from which a user can operate the computer, access all of the computer's applications and freely brows the Internet, but not have any of the computer systems files accessed for export by a trojan or like malicious code. The result of providing a SUEZ enhanced computer system is that, malicious code from an external data source, such as a file downloaded from the Internet or imported from an external data source, cannot steal data or eves-drop on a SUEZ user on the computer.

The present invention is a secured Windows OS electronic computer system having a software based isolated User environment protected from unauthorized access to and manipulation of data on the system. The software of the present invention on a Windows® OS computer system implements an isolated User file system and provides process/IPC isolation, Windows® registry isolation, network interface isolation, and isolated administrative control on the computer system. Interactive components of the system include an execution hook component, a job object component, a system call hook component, a file system block device driver, a file system/filter driver, a network interface/NDIS hook component, and an environment handler.

The execution hook component traps system calls requesting process execution. It also initiates creation of the isolated User environment (IUE) and manages assignment of successive process execution requests to the appropriate method of execution. To provide appropriate isolated process execution control, the execution hook traps all calls to load an executable image and tests them for an assigned User context. All execution requests without a User context are either assigning an administrative context and passed on for processing in the manner native to a Host computer system or assigning a User context by interrogating the environment handler for User authentication and credentials etc. Additionally, the execution hook is responsible for triggering requests to the environment handler, upon new User context assignments, to create a new User environment. New User environments include an isolated file system, network connection, Windows registry hive and execution environment. The current requested process and all subsequent processes with User context are bound to this environment. Trapped process execution requests with existing User context are assigned to their associated User specific job object. All filtering done by the execution hook is based on metadata described by the software and environment handler.

The job object component is responsible for creating, destructing, managing and manipulating job objects. It provides an alternative process creation mechanism to that native to the Host computer system by starting User processes in a restricted state. Additionally, it implements User credential based security descriptors that define the restrictions of User processes and provides isolated process/IPC and memory control. All based on appropriate metadata described by the software and the environment handler.

The system call hook component traps and filters all Windows registry I/O requests. This facilitates file system and memory isolation by filtering calls based on their User context and redirecting User registry I/O requests to the User's isolated file system. The system call hook processes User specific credentials, prescribed by the environment handler, to define what registry hives or keys or subset thereof will be abstracted from Host computer systems native registry. All filtering is done based on appropriate metadata described by the software and environment handler.

The file system block device driver component is responsible for mounting and unmounting the isolated User file system. This facilitates isolating the file system from the Host computers file system namespace.

The file system filter driver component filters all file system I/O requests to accomplish isolation of the User file system. The driver redirects file system I/O requests associated with a User context to that User's isolated file system. By providing granular proxy of all file system I/O, the file system filter driver facilitates the redirection of all or some subset of I/O based on request type, requested file system and object credentials or type. All filtering is done based on appropriate metadata described by the software and environment handler.

The network interface/NDIS hook component is responsible for abstracting the User's network interface from the Host computer system's network interface. Additionally, it provides bridging, packet filtering and other services typical of network interface control. All filtering done by the NDIS driver is based on metadata described by the software and environment handler.

The environment handler provides environment management services for all the software components making up the IUE. It reveals an administrative configuration interface allowing the definition of rules and general configuration data. The environment handler also managing and defines User authentication and credentials for all the IUE software components. This includes prescribing filter metadata and periodically obtaining log statistics from the software components as well as revealing other controls typical of software management systems.

DETAILED DESCRIPTION OF THE INVENTION

Figure 1:
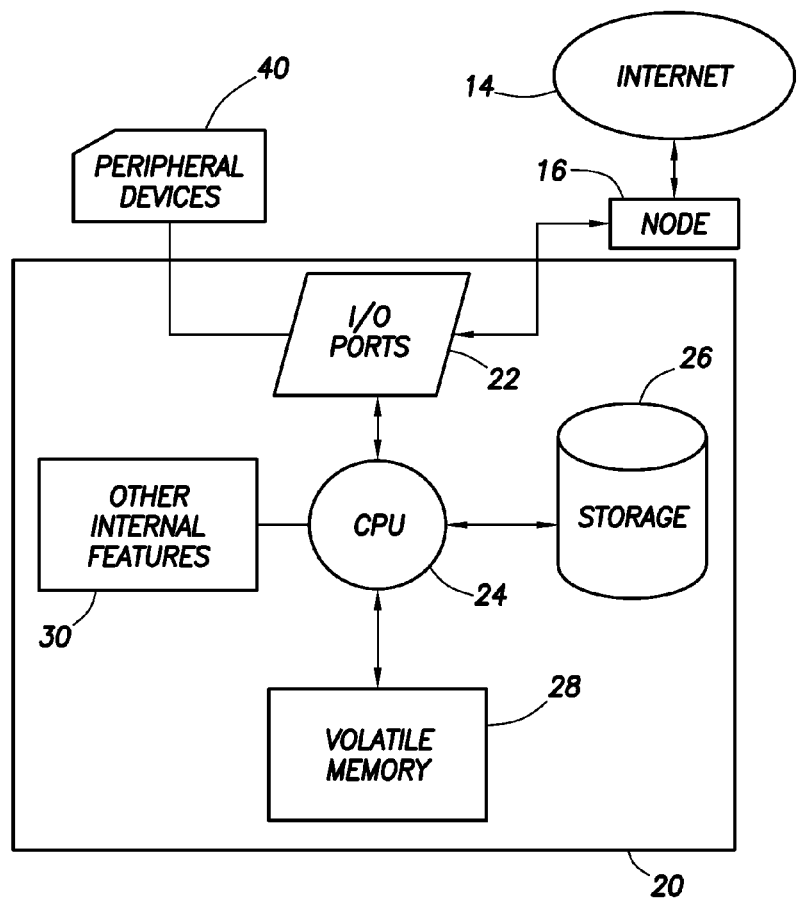
FIG. 1 is a block diagram of a general interconnect scheme for certain internal components of a typical computer and its connection to the Internet.

The following detailed description presents an embodiment of the invention providing isolation of a User (User being the computer operator bound by the conditions of the preferred embodiment) environment to the extent that all User interactions with the computer system, including process execution, interprocess communication (IPC), file system I/O (input/output), Windows registry I/O and network I/O are isolated from the hosting computer systems operating environment (referred to below as Host), in such a way as to protect Host from User transgressions, such as maliciously caused destruction, unauthorized modification, or unauthorized disclosure of data.

The preferred embodiment will be described with reference to the accompanying drawings and broken into 3 sections to better describe the present invention. Section one will describe the hardware and Host computer system environment across multiple operating states with the preferred embodiment implemented. Section two will provide a system level overview of the embodiment. Section three will be a description of use cases.

Referring now to the drawings, the details of preferred embodiments of the present invention are graphically and schematically illustrated. Like elements in the drawings are represented by like numbers, and any sub-components of the same element are represented by like numbers with a different lower case letter suffix.

Operating States

The description of FIGS. 1 through 7D will provide a comprehensive view of the preferred embodiment at multiple states of operation on a preferred type computer system and hardware, but is not intended to limit the applicable environments. One of ordinary skill in the art will recognize that the present invention can be implemented with the accompaniment of other electrical computer system configurations; multi processor systems, main frame computers, hand held devices, consumer electronics and embedded systems are examples of such. One can appreciate that the present invention can also be practiced in combination with remote processing and or data storage, whether over a distributed network or via removable hardware or media directly interfacing the hosting computer system.

As shown in FIG. 1, the Internet 14 is typically accessed by a computer 20 via an Internet node 16. Depending on the configuration of the computer 20, the node 16 represents a device or devices such as a modem, a network card, a router and other interface hardware for connecting the computer 20 to a network such as the Internet 14 via an I/O port 22. Other external data sources, such as floppy drives, optical disk drives and other external data storage devices are also connectable to the computer 20 via an I/O port 22 as a peripheral device 40.

Preferable, the computer system 20 can be of any configuration or manufacture running a Microsoft WINDOWS® operating system (preferably WINDOWS 2000®, XP® or compatible operating system). These include desk-tops, lap-tops or other devices having a CPU, storage and connectivity to an external data source, e.g., the Internet 14. In a preferred simple embodiment as exemplified in FIG. 1, the present system comprises a computer 20 to which is connected certain peripheral devices 40, such as a keyboard, monitor, and printer (and optionally, to an external data storage device) through a number of input/output (I/O) ports 22. Also connected to the computer via an I/O port 22 is an Internet node 16. The node device 16 can be any of a number of such devices known in the art and compatible with the configuration of the computer 20 to which it is attached to accomplish this purpose, such as modems, routers, etc. Although the peripheral devices 40 and the node 16 are illustrated in the example of FIG. 1 as external to the computer 20, it is intended and is appreciable by one of ordinary skill in the art that these elements can be incorporated into or share the same housing as the computer 20 to one degree or another. The structure and function of the other computer components and their connectivity and communication interrelationships are typical of the field and known to one of ordinary skill in the art. Control of the Internet node 16 and other peripheral devices 40 is typically accomplished in the usual manner via the computer 20—to which they are attached. In addition to the I/O ports 22, the computer 20 comprises the other internal features and components typical of a PC, such as a central processing unit (CPU) 24, one or more data storage devices 26, volatile memory (e.g., RAM) 28, and other internal features and components 30.

Figure 2:
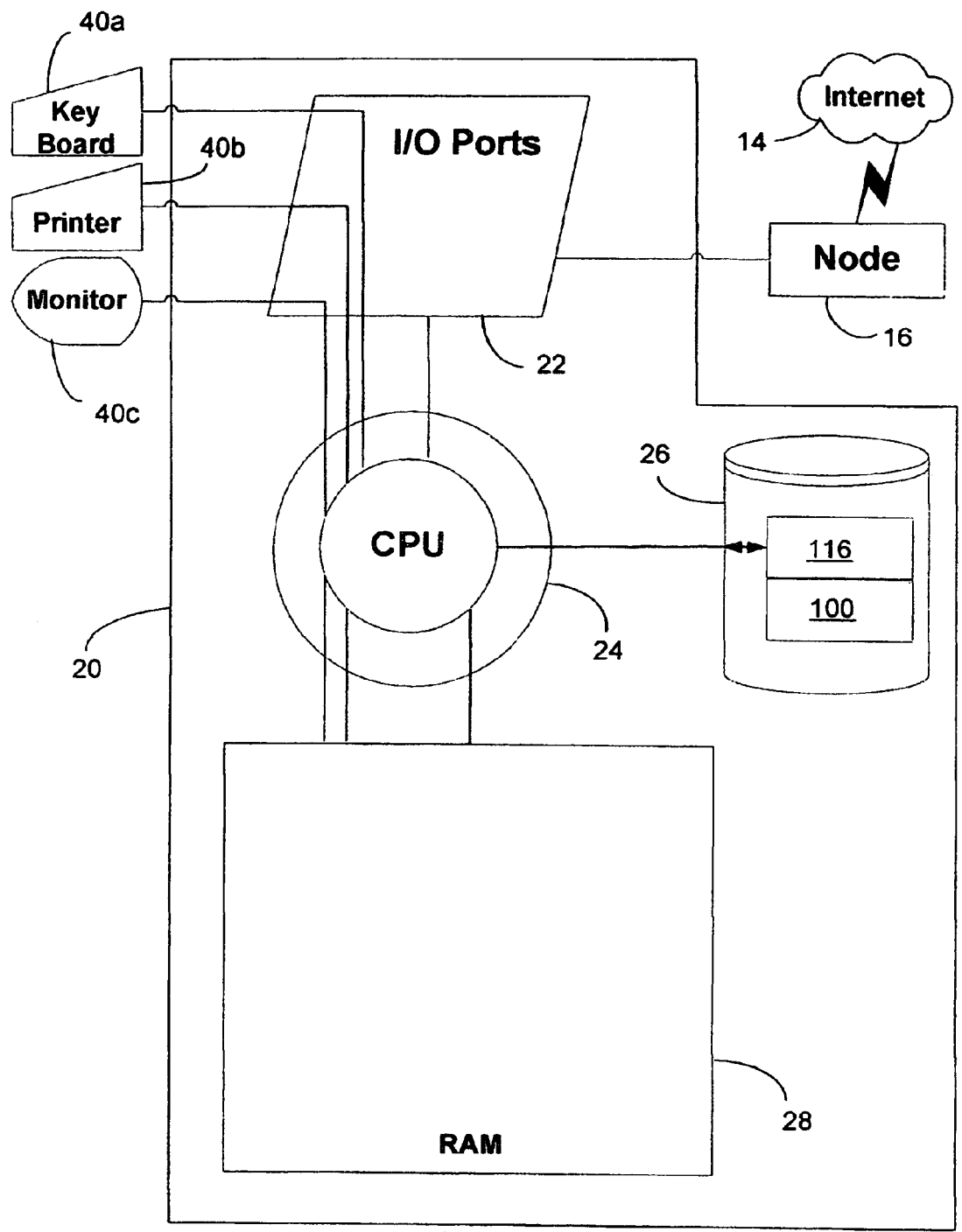
FIG. 2 is a block diagram depicting the configuration of a typical PC-type computer upon installation of an application comprising the present Secure User Environment Software (SUEZ) onto a PC-type computer system of FIG. 1.

The present Isolated User Environment (IUE or SUEZ) system is installable on a typical computer system as illustrated in FIG. 2. FIG. 2 depicts the Installation State or the configuration of the computer system 20 upon installation of the IUE components. In a preferred embodiment, an external data source (not shown) was used to install the IUE components into data storage on a PC type computer 20. Installation of the IUE application caused certain new files or sets of files 100 to be written to the data storage device (i.e., the internal disk drive) 26 of the computer 20. Additionally, installation of the IUE software caused the modification of certain of the computer's pre-existing files 116. The combination of these two file sets 100 & 116 comprise the IUE software. In the embodiment illustrated, the installation condition persisted in data storage even though the IUE application was not activated until after the computer's operating system (OS) was rebooted.

The Ready State configuration of the computer occurs on every start-up of the computer 20, i.e., upon every reboot after installation of the present IUE software. Starting up the computer once the IUE application is installed causes functions or processes to run in memory: a IUE driver set 300 and a IUE environment (bubble) manager process 340. A detector function residing in the driver set 300 monitors the operating system for process execution requests to detect and trap the occurrence of a detector trigger event. The environment manager 340 provides management services for the components of the IUE application, such as user profile and administration configurations.

Figure 3:
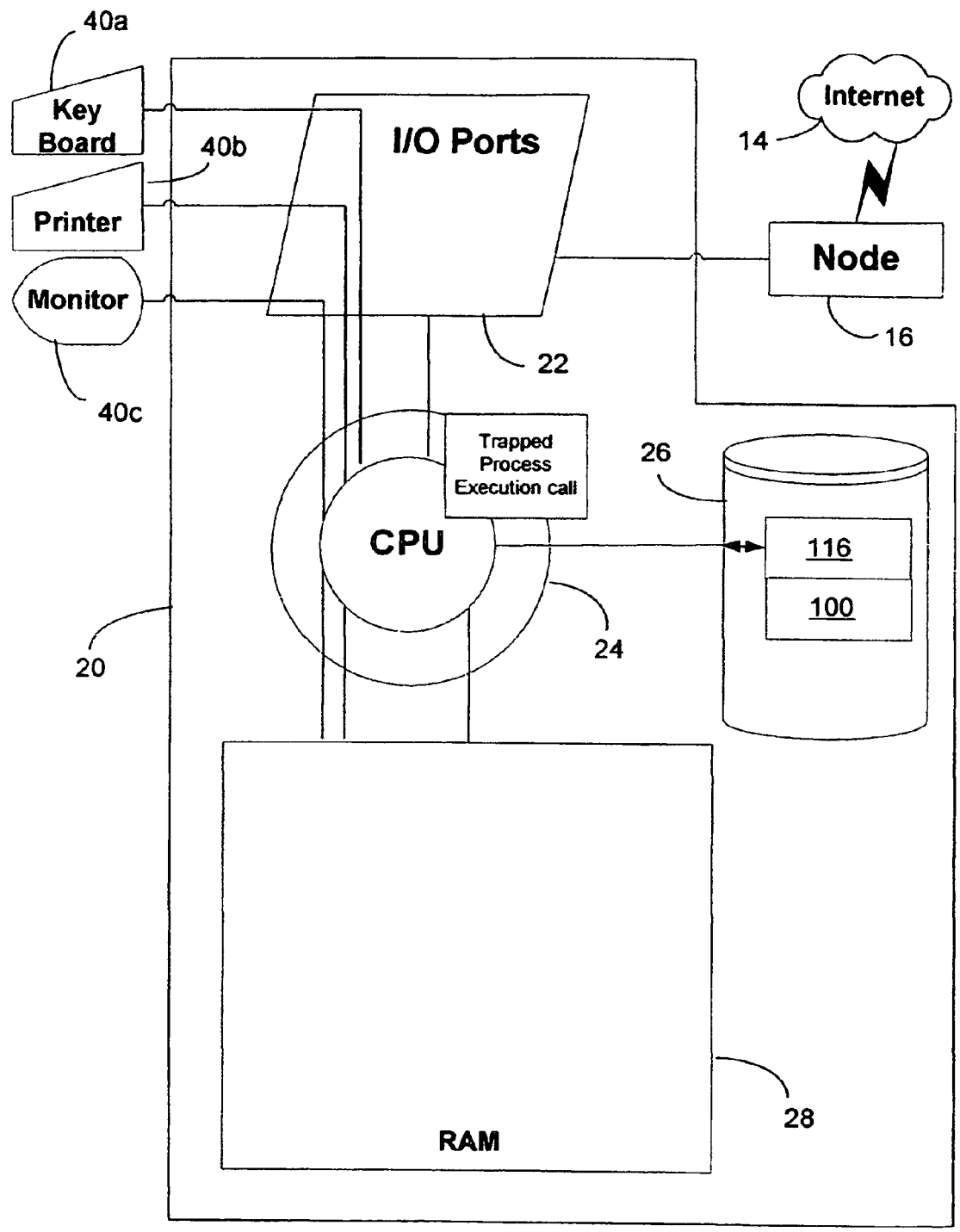
FIG. 3 is a block diagram depicting the Ready State configuration of the computer upon the trapping of the first process execution call after its initial activation on the computer.

In the embodiment illustrated in FIG. 3, the detector trigger event was a process execution system call. On being triggered, the detector function traps the call checking for the presence of a proper User "context." The term "context" is a term of art, and as used herein is to be given its usual meaning as generally known in the field. If a proper context is found, the call is passed to the Object Manager FIG. 10. If a proper context is not found, the call is passed to the Environment Handler for authentication, see FIG. 12.

Figure 4A:
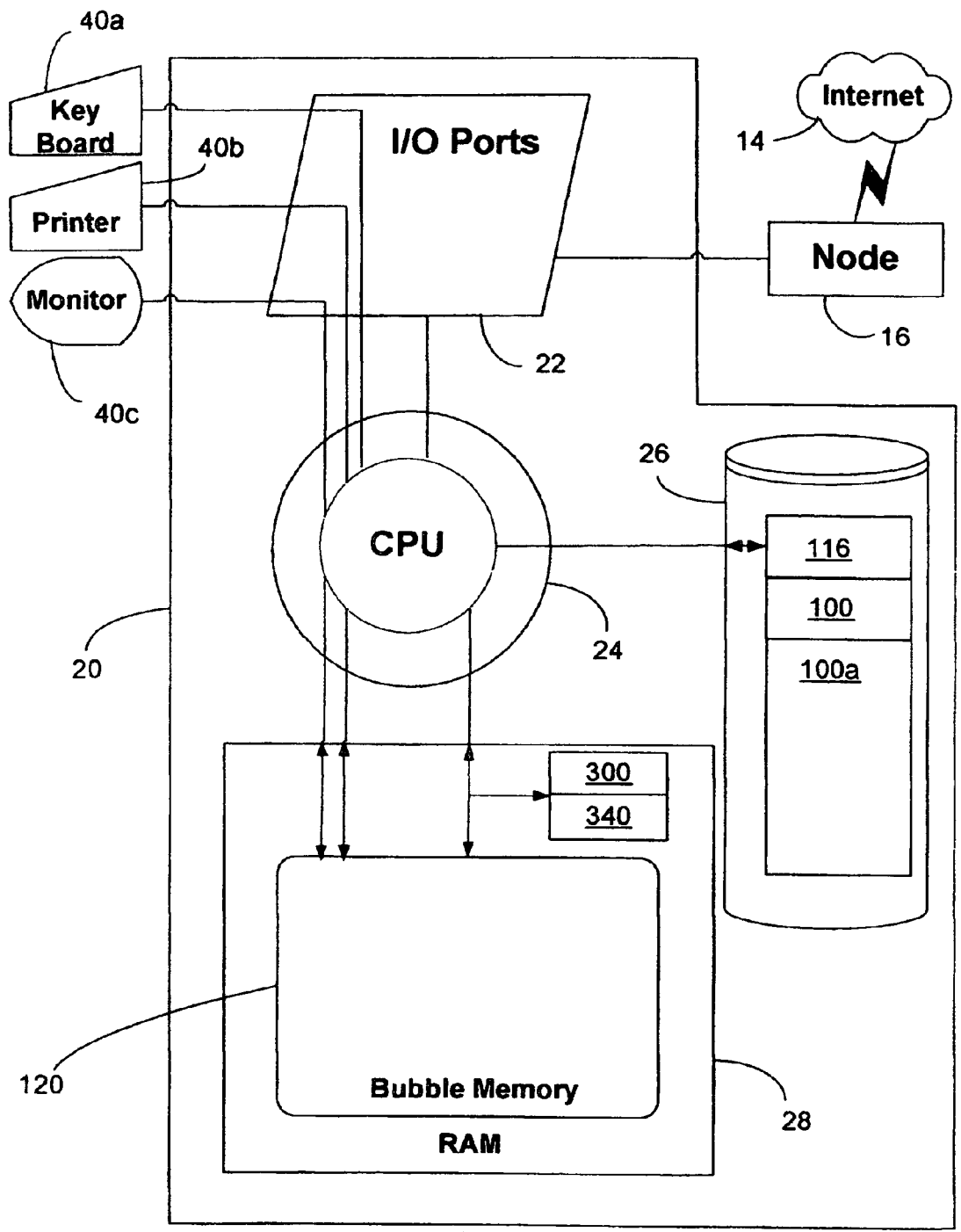
FIG. 4A is a block diagram depicting an Active State configuration of the computer of FIG. 3 at a point after a first trigger has been detected and a proper "context" has been assigned or recognized for a triggering execution call, but before the associated thread has been passed to the computer's CPU.

FIG. 4A depicts the Active State/Triggered configuration of the computer 20, which occurs at a point after a first trigger event has been detected and a proper context has been either detected for or assigned to the trapped process execution call. In the state depicted, a context and the IUE bubble are established. The IUE bubble comprises a memory allocation (bubble memory) 120 and a storage allocation (bubble storage) 100a. Bubble memory 120 is typically an allocation of RAM, and bubble storage 100a is typically a flat file mounted as a block device by the driver set 300. At this point, the triggering process is assigned to the job object, "loaded suspended" into bubble memory 120, but is not yet passed to the CPU 24 for execution. For example, in the case of a trigger such as a browser call (e.g., a call to load Internet Explorer®), at this point the browser is loaded into bubble memory 120, but not yet executed, therefore no browser initiated connection has been made to the Internet 14.

Figure 4B:
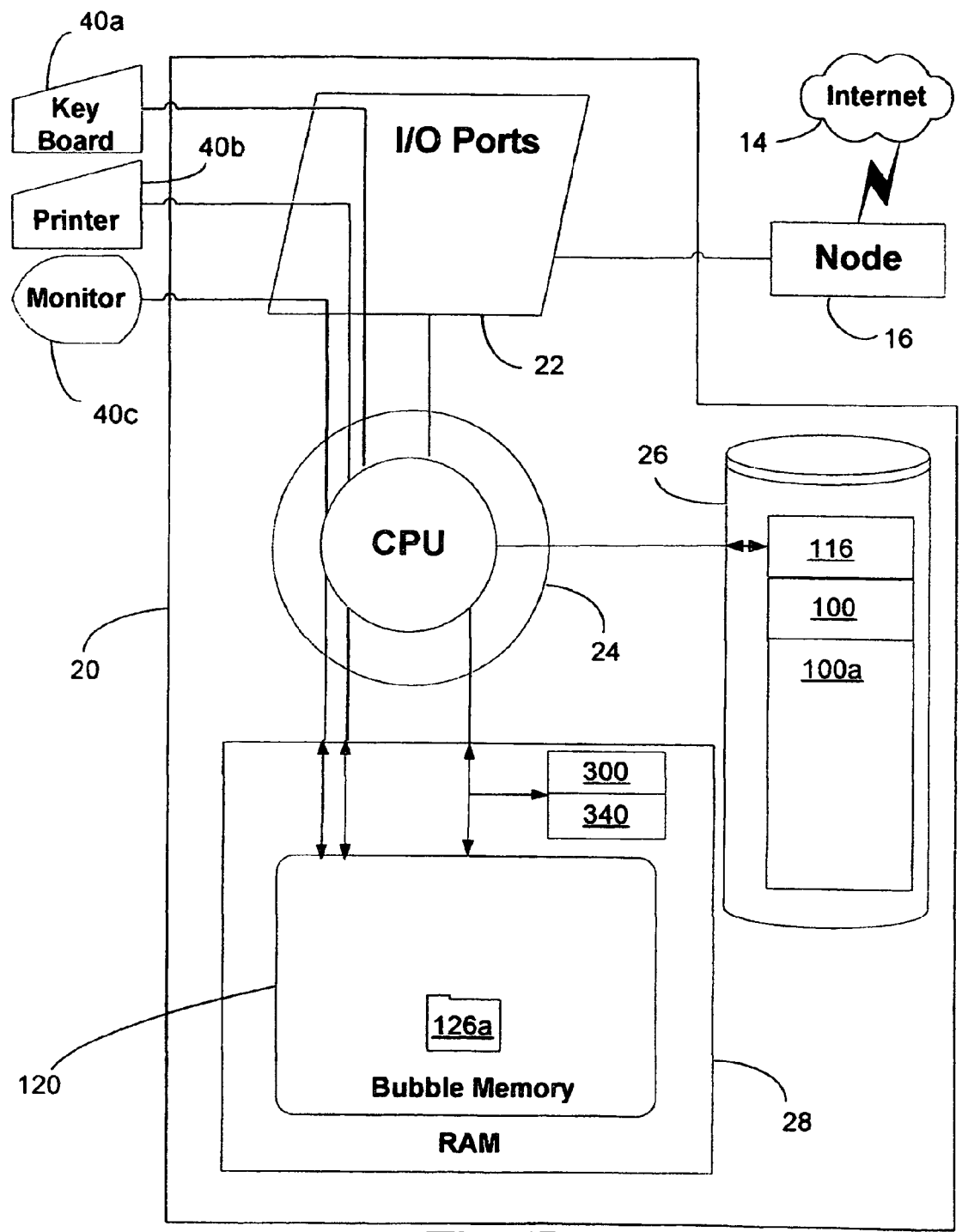
FIG. 4B is a block diagram depicting an Active State configuration of the computer at a point after that of FIG. 5A, at which point the associated thread has been passed to the computer's CPU and executed, which has caused certain processes (e.g., a browser application) to be loaded into bubble memory and a connection to be established to certain peripheral devices.

FIG. 4B is a block diagram depicting an Active State configuration of the computer at a point after that of FIG. 4A, at which point the associated process thread 126a, currently loaded into bubble memory 120, has been passed to the computer's CPU 24 and executed. At this point the triggering process is now running.

Figure 4C:
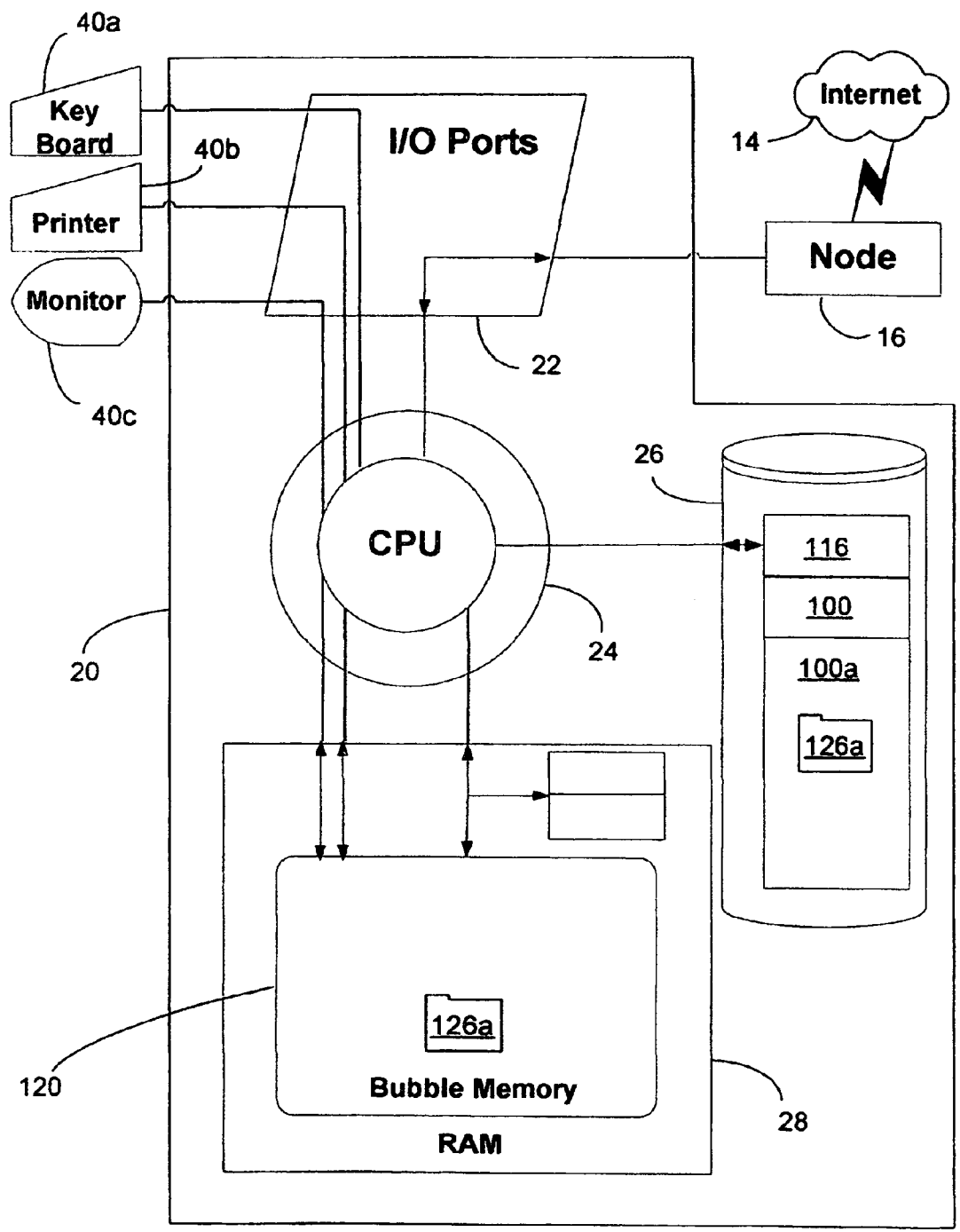
FIG. 4C is a block diagram depicting an Active State configuration of the computer at a point after that of FIG. 4B, at which point a connection to the Internet has been established.

FIG. 4C depicts an Active State configuration of the computer at a point after that of FIG. 4B, at which point a connection to the Internet 14 has been established by the triggering process 126a (e.g. Internet Explorer browser), which is now running in memory 120. Data generated by the running process 126a and stored locally are isolated to bubble storage 100a by the IUE driver set 300.

Figure 5A:
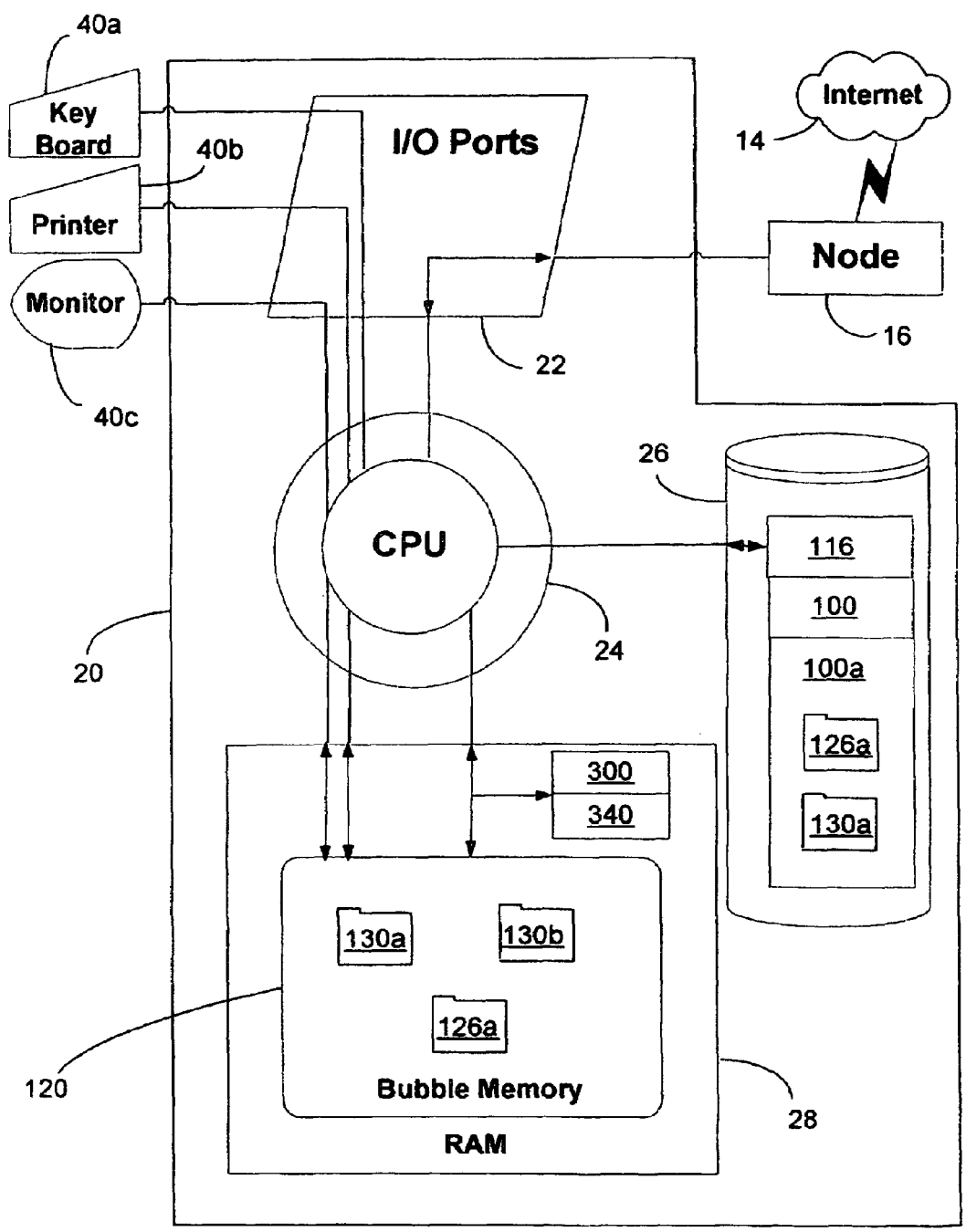
FIG. 5A is a block diagram depicting a configuration of the computer running the present SUEZ at a point after that of FIG. 4B, at which point additional process are loaded into bubble memory, which processes are derived from an external data source such as the Internet and some portion of which may be saved to bubble storage.

FIG. 5A, illustrates a subsequent condition where additional processes 130a & 130b, each having a IUE context, have loaded into bubble memory 120. In this example, the processes 130a & 130b are derived from an external data source such as the Internet 14. If one of the processes 130a attempts to write to the computer's native data storage 26, the driver set 300 redirects the write request to bubble storage 100a.

Figure 5B:
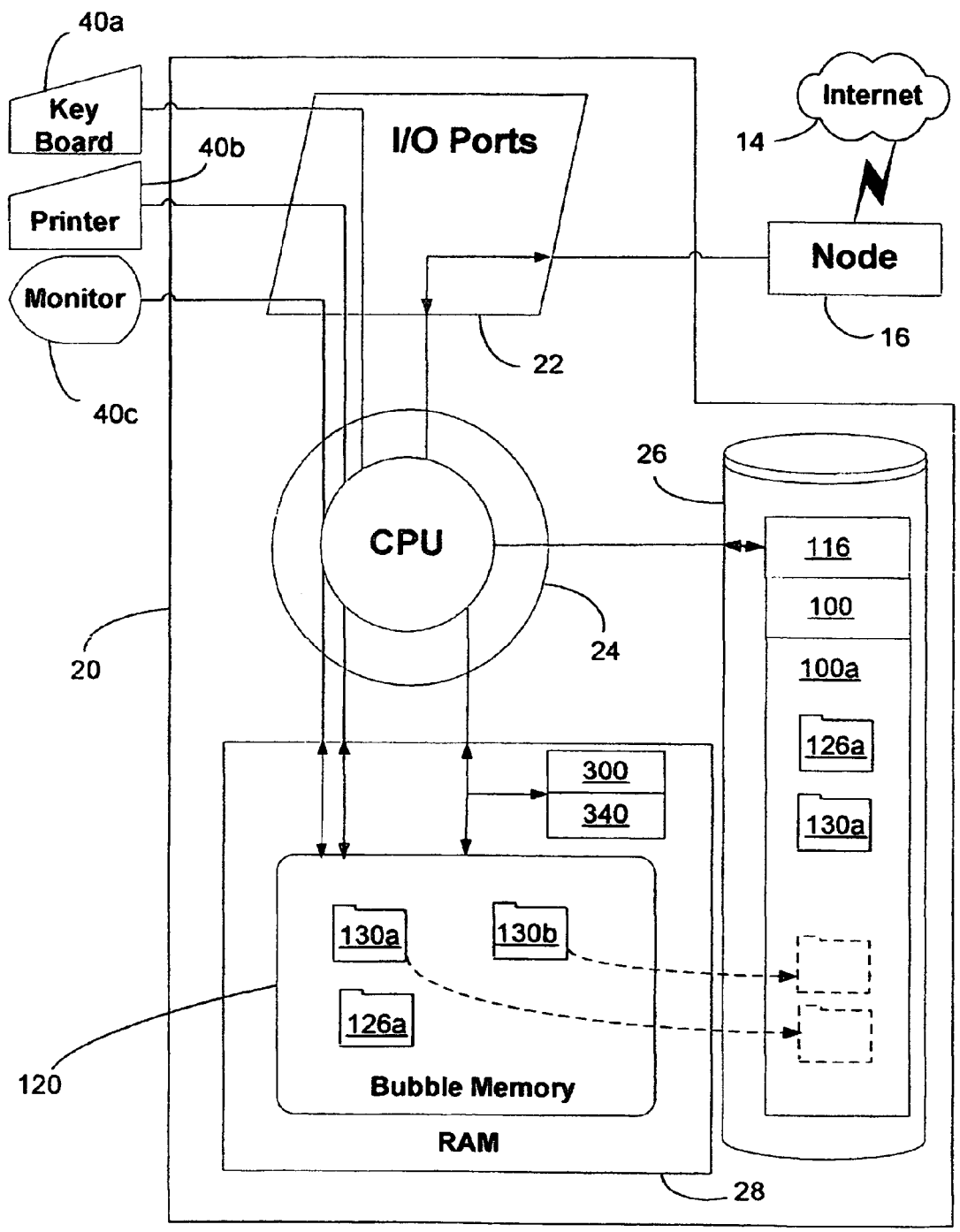
FIG. 5B is a block diagram depicting a configuration of the computer running the present SUEZ at a point where the downloaded modules in bubble memory are attempting to write, but all write calls originating in bubble memory can only be sent to bubble storage.

FIG. 5B depicts a configuration of the computer running the present IUE at a point where the downloaded modules in bubble memory 130a, 130b are attempting to write to the systems data storage at paths common to a typical installation of the Windows operating system (e.g. C:\%systemfolder%\system32). However, all write requests originating from a process 130a 130b in bubble memory 120 are transparently redirected to a like path within bubble storage 100a (e.g., %BUBBLE_DEV%:\%systemfolder%\system32) by the driver set 300.

Figure 5C:
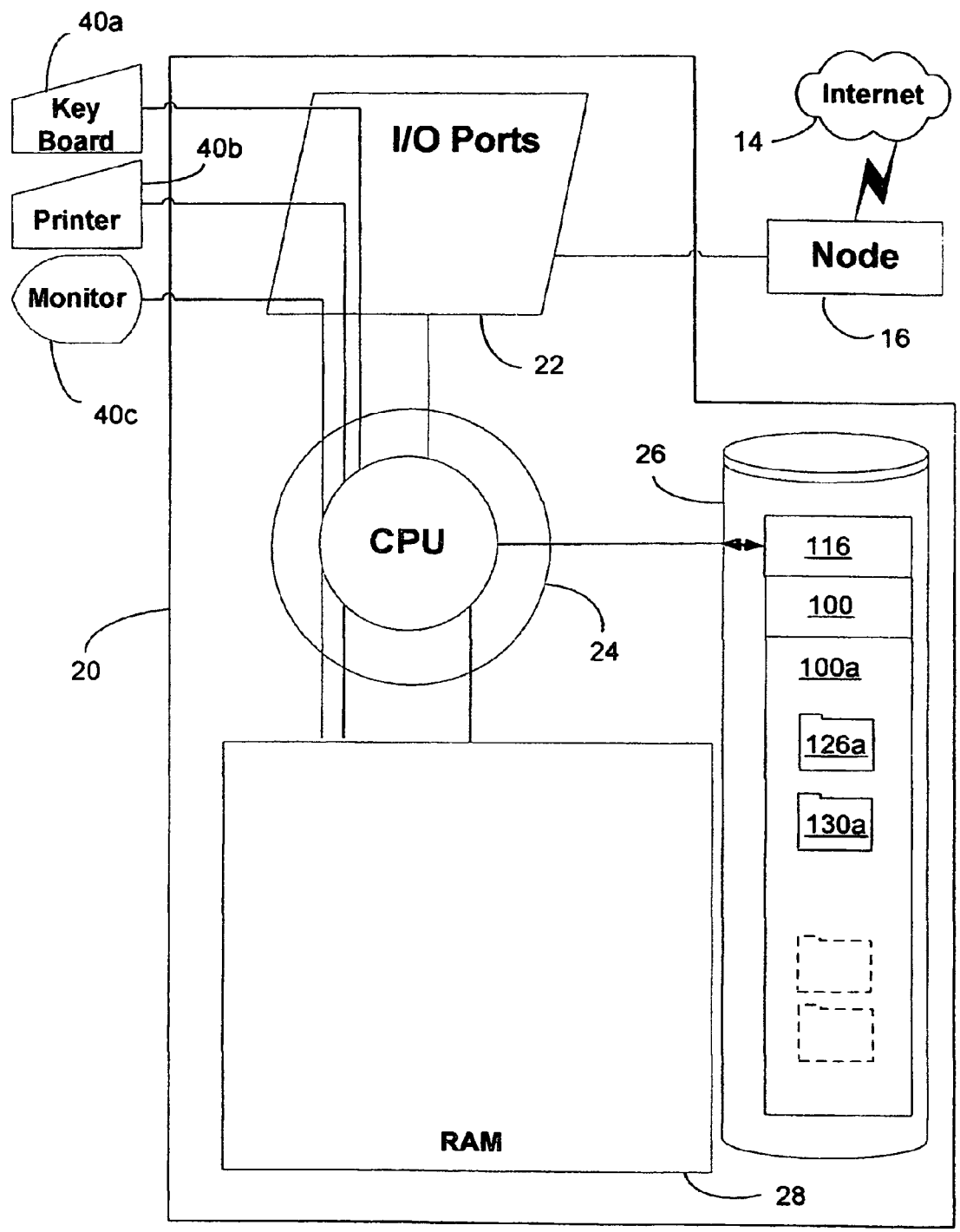
FIG. 5C is a block diagram depicting a configuration of the computer running the present SUEZ at a point in the shutdown process where the user has logged-off, causing the connection to the Internet to close and bubble memory to be killed. However, any write call executed during the session to bubble storage remains isolated in bubble storage, unless otherwise deleted, e.g., by a "clean-up" function.

FIG. 5C depicts a configuration of the computer running the present IUE at a point in its shut-down process, where the user has logged-out of the IUE environment, causing the connection to the Internet 14 to close, all processes 130a 130b 126a running in the bubble memory 120 to be closed and bubble memory 120 to be killed. However, any write requests redirected to bubble storage 100a by the driver set 300 during the session remain isolated in bubble storage 100a, unless otherwise deleted, (e.g., by a "clean-up" function, virus scan, manually, etc.).

Figure 5D:
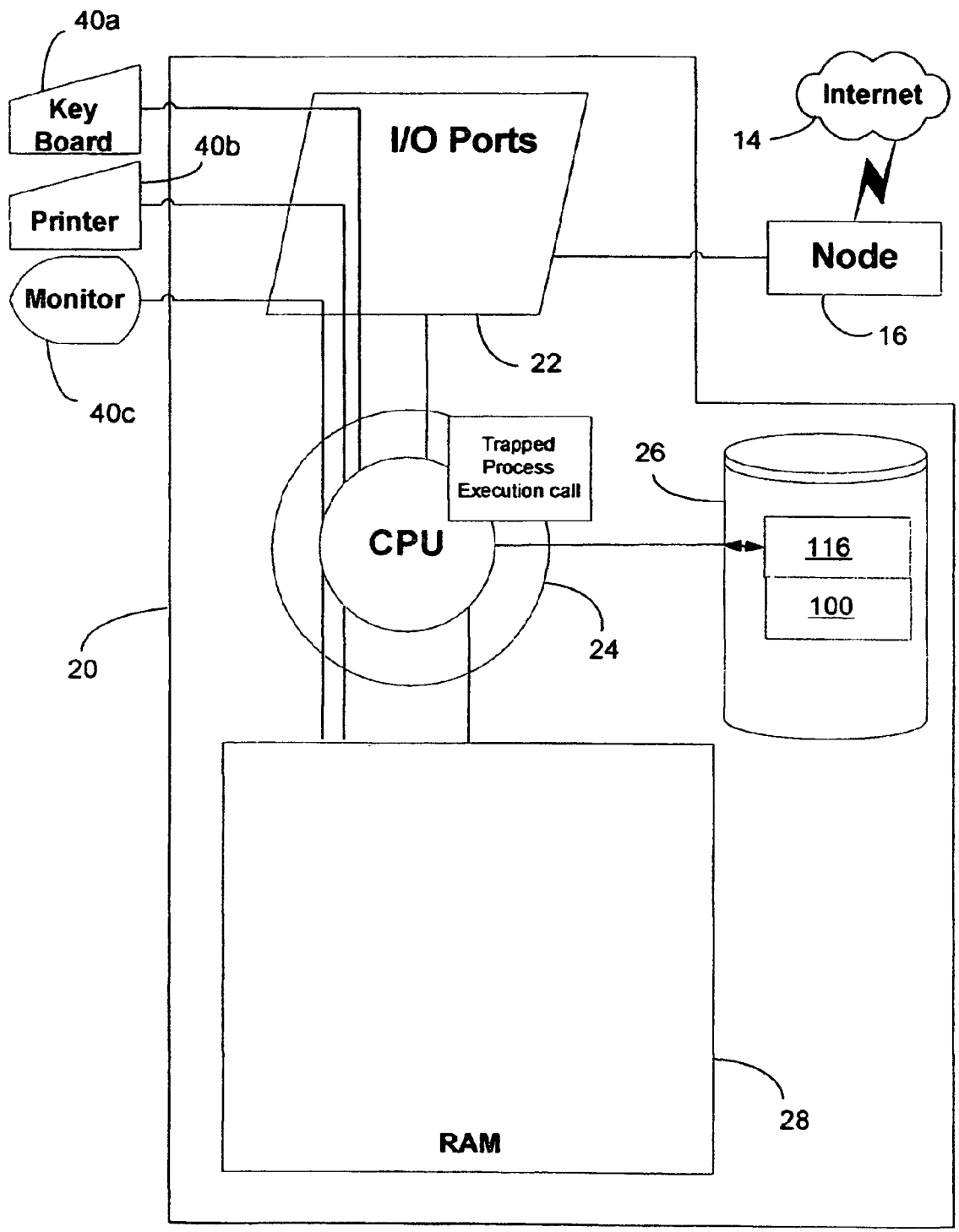
FIG. 5D is a block diagram depicting a configuration of the computer running the present SUEZ at a point in the shutdown process where the SUEZ data storage space (bubble storage) is unmounted and appears to the operating system to be configured as a single encrypted flat file stored on a data storage device.

FIG. 5D depicts a configuration of the computer running the present IUE at a point in its shut-down process where the IUE data storage space (bubble storage) 100a is unmounted by the driver set 300 and appears to the operating system to be configured as a single flat file 100 stored on a data storage device 26.

Figure 6:
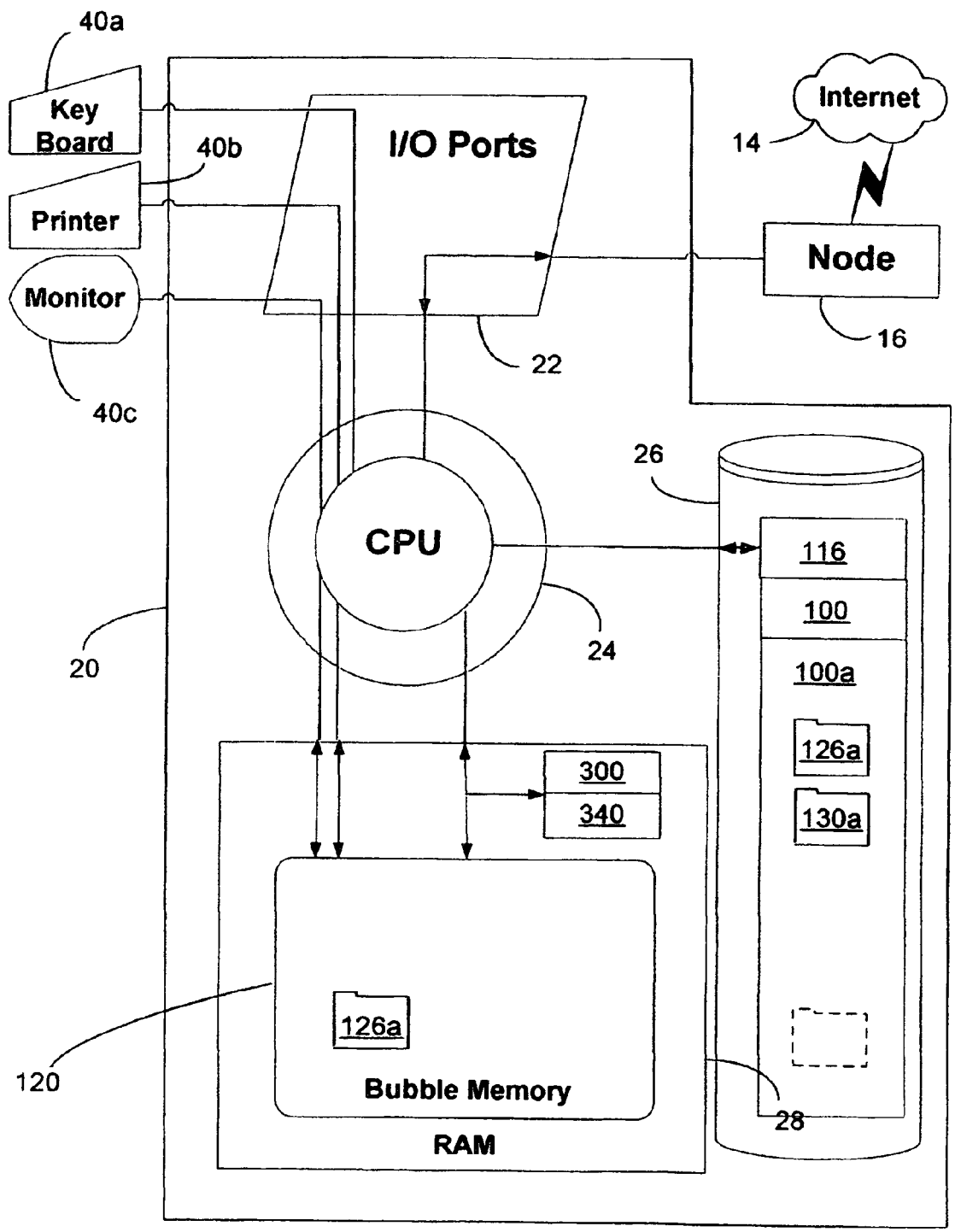
FIG. 6 is a block diagram similar to FIG. 4C, but depicting an Active State configuration of the computer on a subsequent initiation of the SUEZ environment. In this configuration, when the stored SUEZ data space is mounted, it contains the data written to it in previous SUEZ sessions, and illustrates the persistence of certain data created in the previous SUEZ session.

FIG. 6 is similar to FIG. 4C, but depicts an Active State configuration of the computer 20 on a subsequent initiation of the IUE environment. In this configuration, when the stored IUE data space 100 is mounted by the driver set 300, expanding it to a block device file system 100a typical of personal computers. The block device file system 100a contains the data 126a 130a written to it in previous IUE sessions. This condition illustrates the persistence and availability of certain data created in a previous IUE session.

Figure 7A:
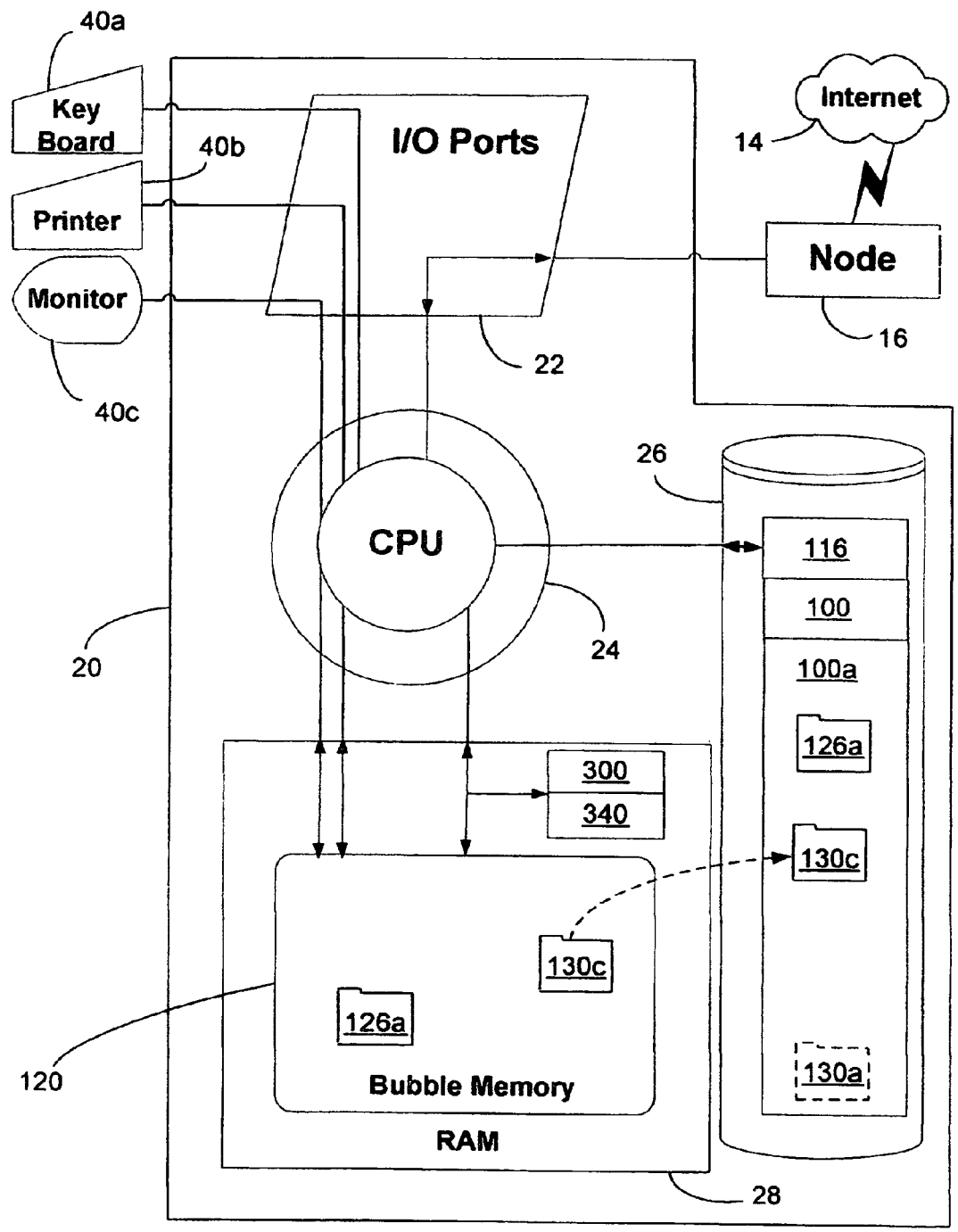
FIG. 7A is a block diagram depicting a configuration of the computer running the present SUEZ at a point in the active state where a module containing a trojan has been downloaded into bubble memory and copied into bubble storage (the SUEZ data storage space) prior to its execution.

FIG. 7A depicts a configuration of the computer running the present IUE at a point in the active state where a module containing a trojan type of malware 130c (malicious code) has been downloaded into bubble memory 120, and copied into bubble storage 100a (as data 130c) prior to its execution.

Figure 7B:
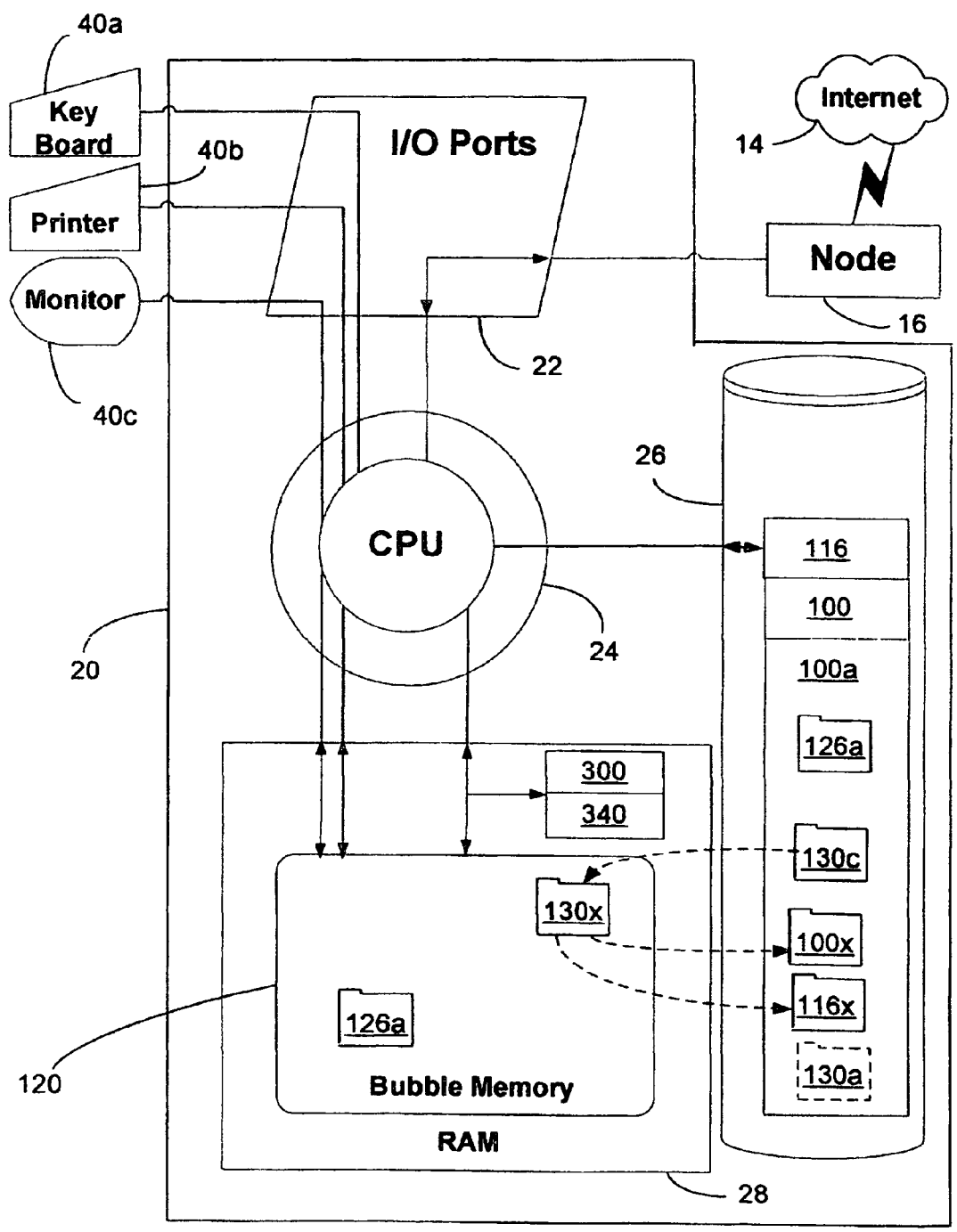
FIG. 7B is a block diagram depicting a configuration of the computer running the present SUEZ at a point in the active state where a file in bubble storage containing a trojan is called from bubble storage and executed in bubble memory. On execution, the trojan attempts to write to a primary system file (e.g., the system registry), but instead is caused by the SUEZ application to be written to the storage bubble.

FIG. 7B depicts a configuration of the computer 20 running the present IUE at a point in the active state where malware data 130c in bubble storage 100a containing a trojan is called from bubble storage 100a, loaded as a process 130x in bubble memory 120 and executed. On execution, the trojan attempts to write to a primary system file/memory (e.g., C:\%systemfolder%\system32, and the system registry), but instead is caused by the driver set 300 to write to bubble storage 100a at like paths 100x & 116x (e.g., %BUBBLE_DEV%\%systemfolder%\system32, and the IUE registry implementation).

Figure 7C:
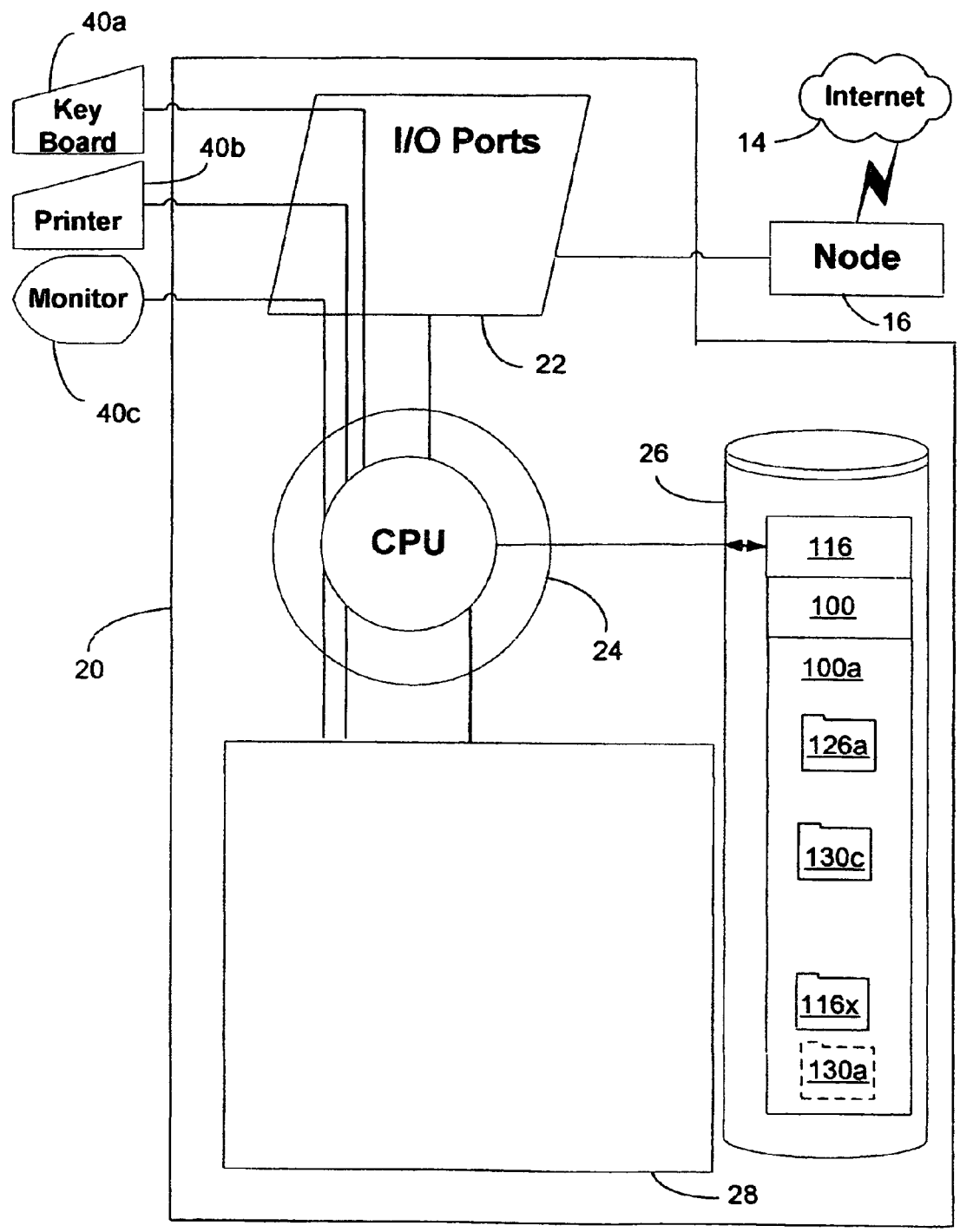
FIG. 7C is a block diagram depicting a configuration of the computer running the present SUEZ at a point in the shutdown process where the user has logged-off, causing the connection to the Internet to close and bubble memory to be killed. However, any writing executed during the session to bubble storage remains isolated in bubble storage, unless otherwise deleted as shown, e.g., by a "clean-up" function.

FIG. 7C depicts a configuration of the computer 20 running the present IUE application at a point in its shut-down process where the user has logged-out of the IUE environment, causing the connection to the Internet 14 to close, all processes 130x 126a running in the bubble memory 120 to be closed and bubble memory 120 to be killed. However, any write requests redirected to bubble storage 100a by the driver set 300 during the session, remain isolated in bubble storage 100a, unless otherwise deleted (e.g., by a "clean-up" function, virus scan, manually, etc.).

Figure 7D:
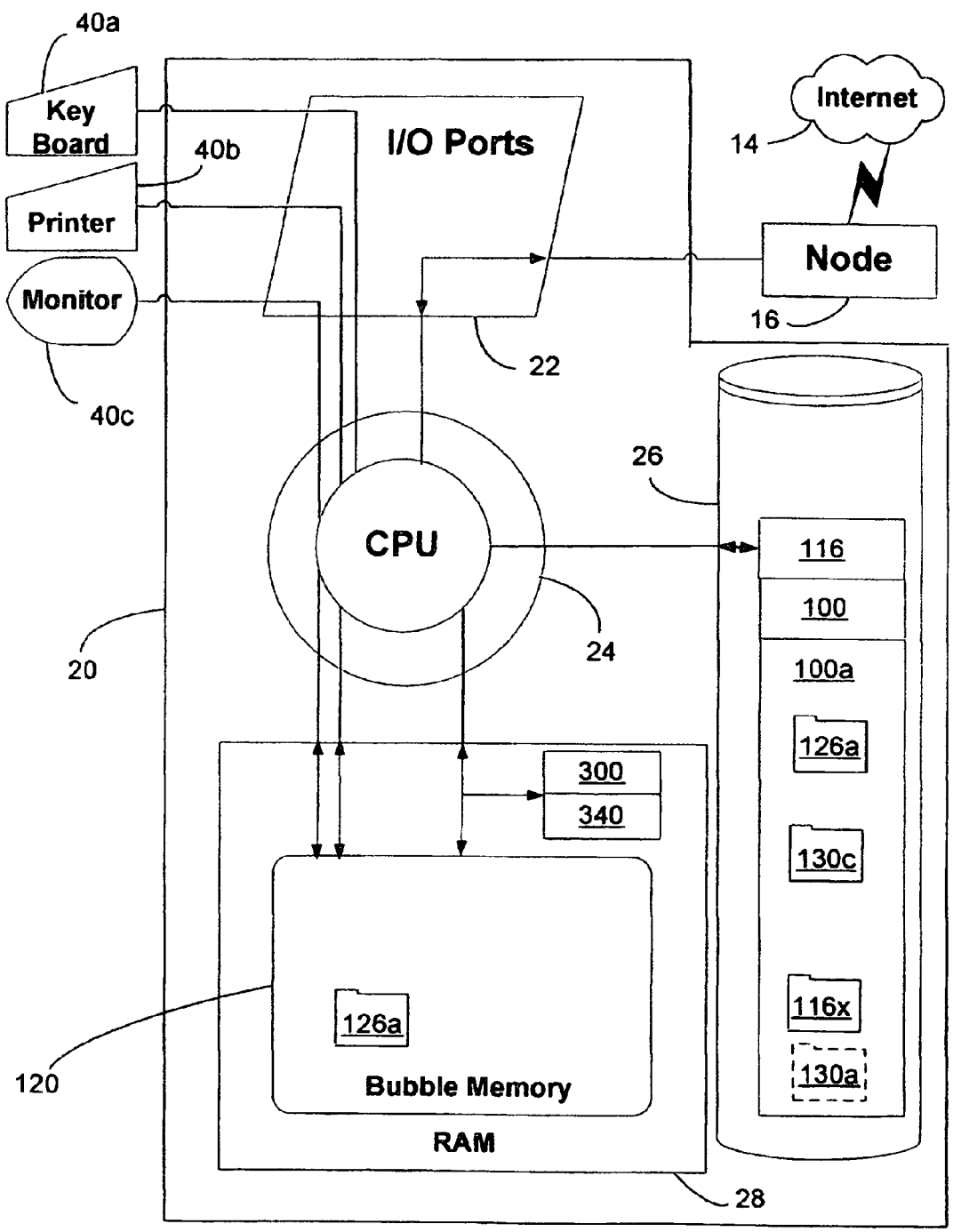
FIG. 7D is a block diagram depicting an Active State configuration of the computer at a point on boot-up after a SUEZ session as depicted in FIG. 7C has been previously run on the computer. In this case, when bubble storage is mounted, it contains the data written to it in previous SUEZ sessions, including the trojan file (unless the file was identified as malicious and eliminated by the cleanup function at the close of the prior SUEZ session). However, because the malicious files created by the trojan were isolated in bubble storage where they were not executed by a reboot or upon mounting of bubble storage.

FIG. 7D is a block diagram depicting an Active State configuration of the computer 20 at a point on boot-up after a IUE session such as depicted in FIG. 7C has been previously run on the computer 20. In this case, when bubble storage 100a is mounted, it contains the data 126a, 130c & 116x written to it in the previous IUE sessions, including the trojan malware

130c (unless the file was identified as malicious and eliminated by the cleanup function at the close of the prior IUE session). However, because the malicious files or data 116x created by the trojan were isolated in bubble storage 100a, where they were not executed by the reboot or upon mounting of bubble storage 100a.

Figure 8:
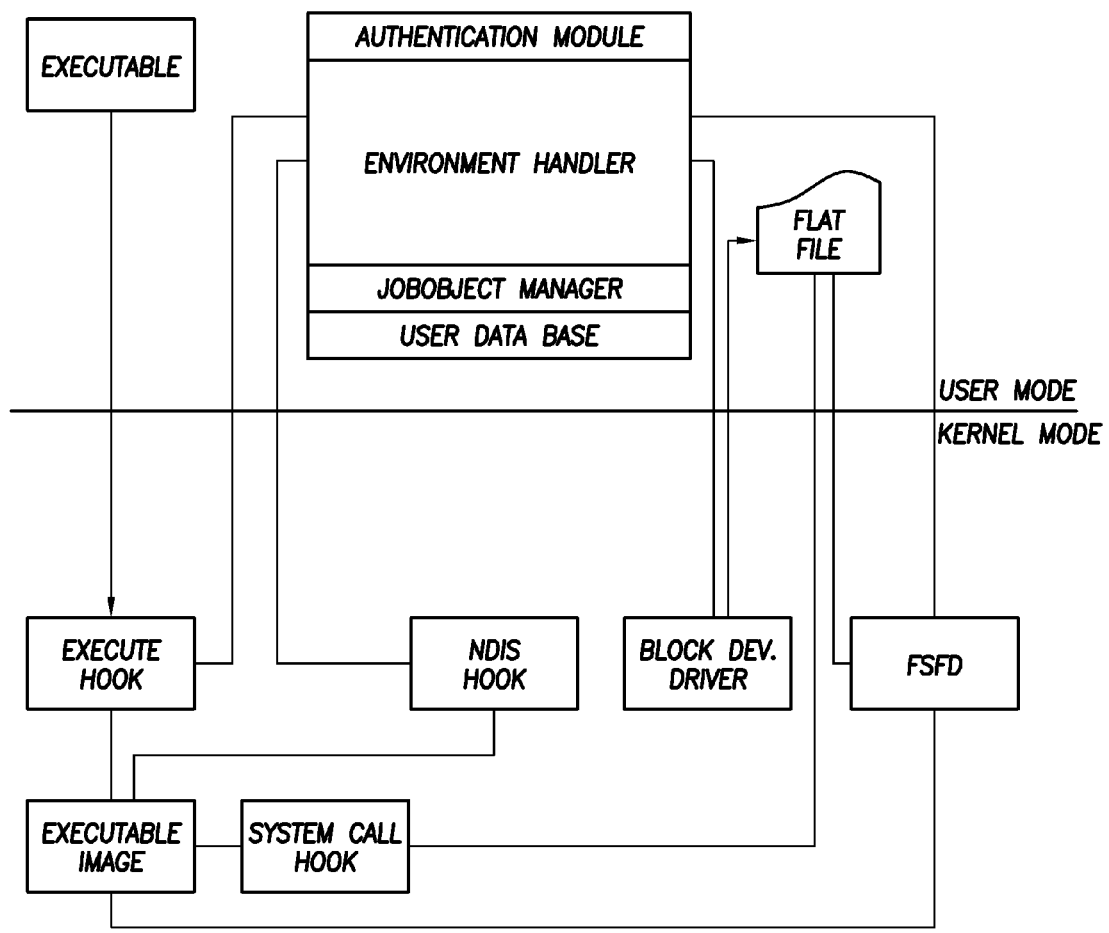
FIG. 8 is a block diagram illustrating an overview of the relationship of the various software and data components of the SUEZ system.

FIG. 8 shows a system in accordance with one embodiment of the invention. The system includes an authentication module (described in FIG. 11), an environment handler (described in FIG. 12), a JobObject Manager (described in FIG. 10), a user database (described in FIG. 12), a NDIS hook (described in FIG. 14), an execute hook (described in FIG. 9), a system call hook (described in FIG. 15), a file system filter driver (FSFD) (described in FIG. 13), and a block device driver (described in FIG. 16). The block device driver and the FSFD are configured to interface with the flat file. Further, the execute hook is configured to interface with the executable. Finally, the executable image is configured to interface with the execute hook and the system call hook.

Figure 9:
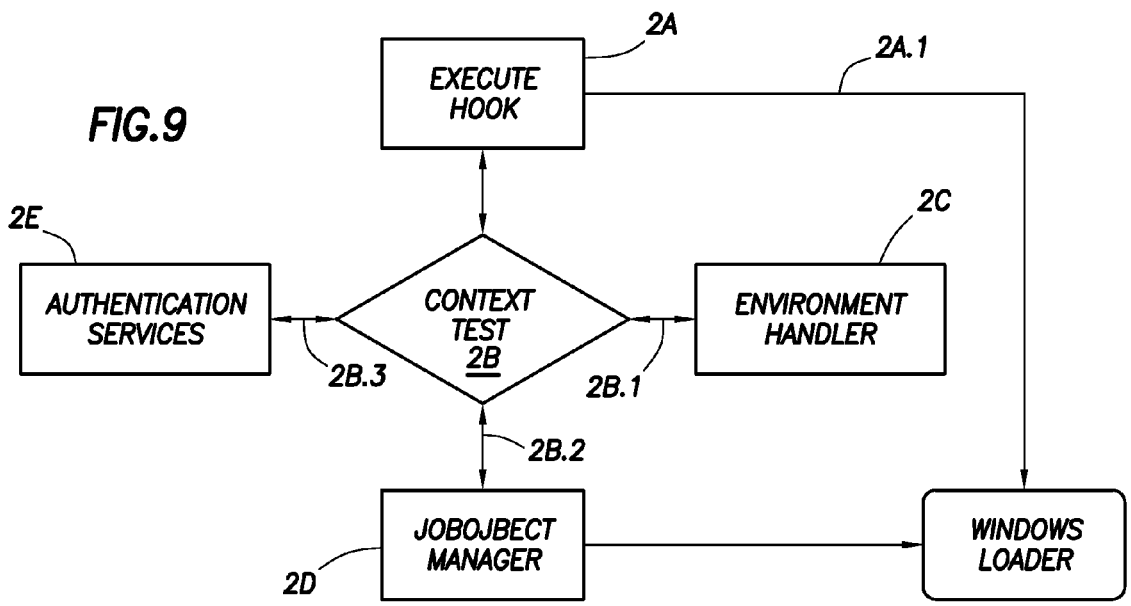
FIG. 9 is a block diagram of the relationship between the Execute Hook module and the other modules of the SUEZ software application.

FIG. 9 show a flowchart in accordance with one embodiment of the invention. The following discussion outlines pseudo to implement the flowchart shown in FIG. 9 in accordance with one embodiment of the invention.

Hook ShellExecute calls

Record process and affiliate parameters

Get pointer to a hash that defines the systems execution context1state . . . Check for context
    EnvironmentHandler(NULL, NULL, . . . , . . ChkHash, . . . , . . . )
      If no context hash1pointer exists
      AuthService( ) Call authentication service and await return . . .
      if return(UserAuthenticated, UID, HashPointer)
        if UID==[0] Super User
          //Continue win32 normal ShellExecute processing
          EscapeHook
        else
          call StartRestrictedProc(NULL, Create, NULL, Process:parameters)
        else return(AuthenticationFailure, NULL, NULL)
        terminate ShellExecute call
        exit silent
    else if context hash1pointer exists
      read hash
        if UID==0
          EscapeHook Continue normal Execute processing
        else
          call StartRestrictedProc(NULL, Add, NULL, Process:parameters)
    else if hash or pointer is corrupt1stale
      return error
      exit.

Figure 10:
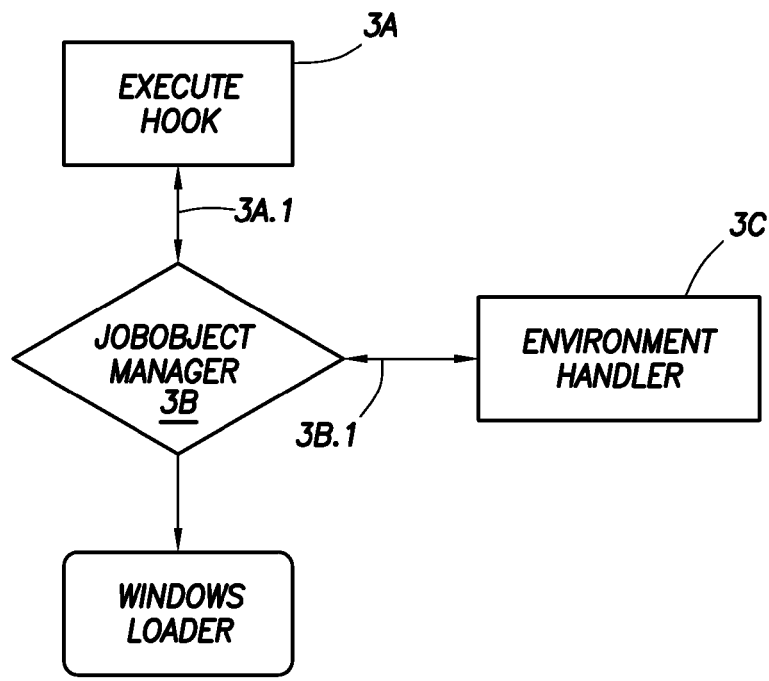
FIG. 10 is a block diagram of the relationship between the Job Object Manager module and the other modules of the SUEZ software application.

FIG. 10 show a flowchart in accordance with one embodiment of the invention. The following discussion outlines pseudo to implement the flowchart shown in FIG. 10 in accordance with one embodiment of the invention.

StartRestrictedProc(pointer, Create|Add process, process, process: parameters)

Define JobObject parameters: Security Descriptors, etc. . .

Receive JobObject management request

Get process/parameters to load for execution if request format is munged
  return error message
  exit else if
  new job object is requested
  EnvironmentHandler Check for haswpointer . . .
    if hash1pointer exists
      return an err message "A Job Object Environment already exists" exit
    else
      CreateJobObject
        MaxIdleTimeCounter=n(! StartIMaintain a proc Idle time clock!)
        AssignProcessToJobObject
        Return error message if failure "Cant Create Job Environment"
  else if add process to object is requested
    EnvironmentHandler
      if hash1pointer exists
        AssignProcessToJobOject( )
      else return err message "There is no current Job Object Environment"
    exit
  else if last process in job quits, call EnvironmentHandler destruct JobObject
    EnvironmentHandler( ) Destruct Environment.

Figure 11:
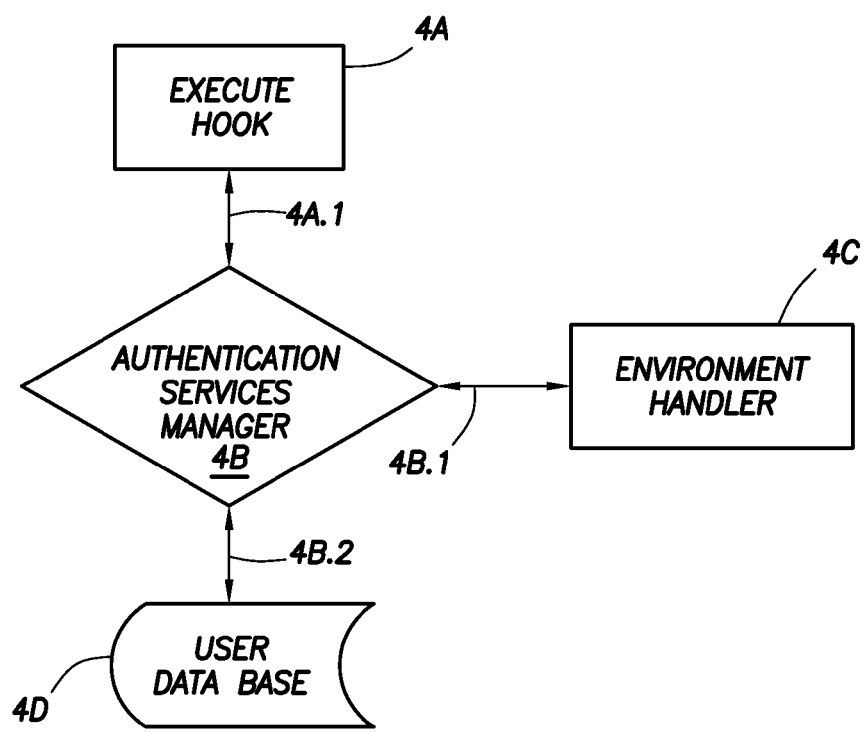
FIG. 11 is a block diagram of the relationship between the Authentication Services module and the other modules of the SUEZ software application.

FIG. 11 show a flowchart in accordance with one embodiment of the invention. The following discussion outlines pseudo to implement the flowchart shown in FIG. 11 in accordance with one embodiment of the invention.

If request for auth
  set authentication counter (maybe 3 try's before auth exits . . . )
  display authentication window (user:password)
  UserAuth( ) Check user:password combination against aflat (txt)Jile
  if Authenticated (U1D:PASSWD match)
    If UID==0 //Super User/Admin
    //Request demi environment creation from Environment Handler
    EnvironmentHandler(UID, NULL, , . . , CreateHash, NULL, NULL, NULL)
    If return is 'success'
      return ('UserAuthenticated', HashPointer) to requestor
      (ShellExecute Hook)
  else
  //Request environment creation from Environment Handler
    EnvironmentHandler(UID, NULL, . . . , . . , . . , InitEnv, NULL)
    If return is 'success'
      return ('UserAuthenticated, HashPointer')
  if Authentication fails
    if AuthCounter >0
      display failed auth/retry authentication window
      decrement counter
    else if AuthCounter <=0
      return auth failure
      exit.

Figure 12:
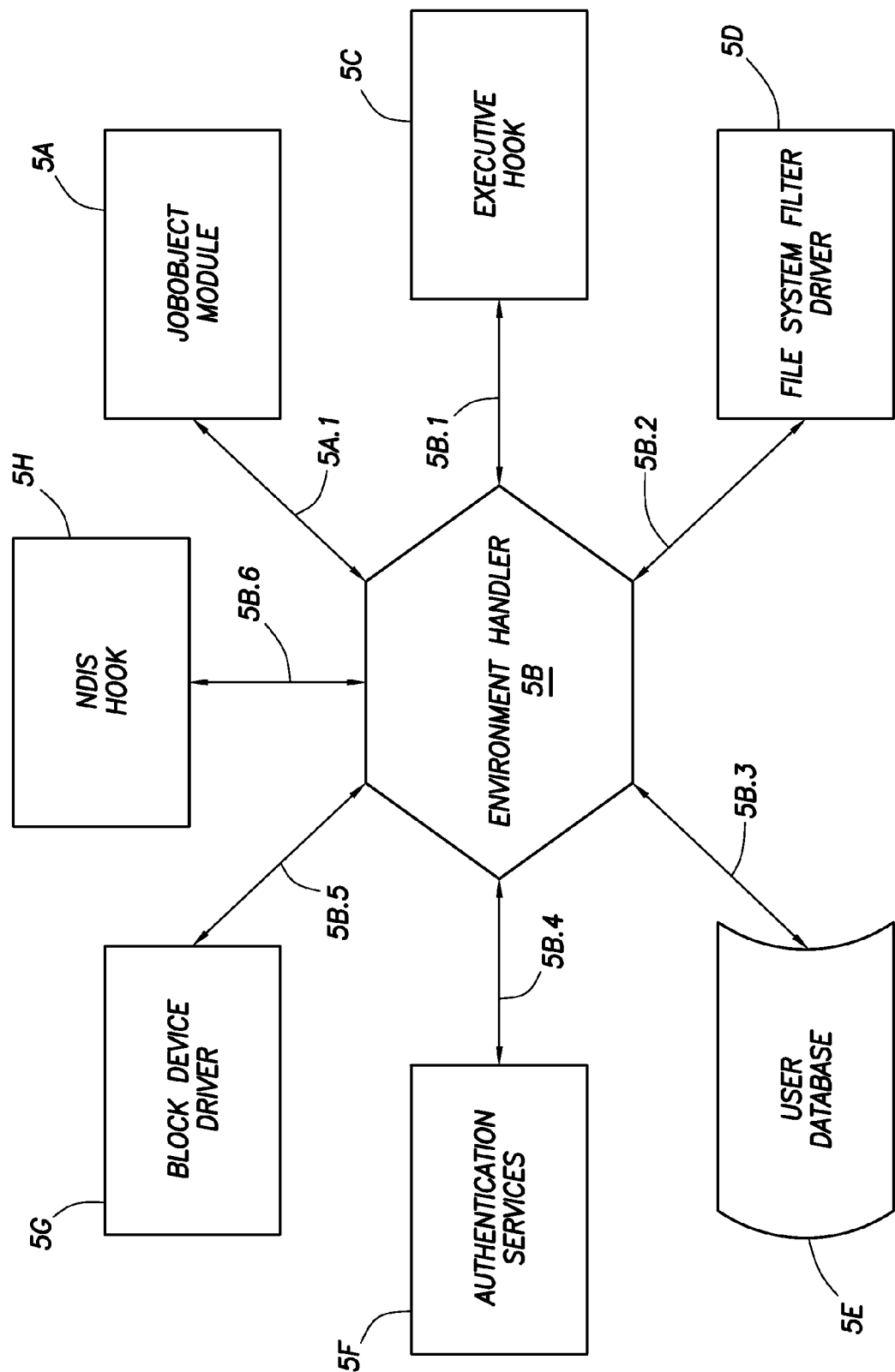
FIG. 12 is a block diagram of the relationship between the Environment Handler module and the other modules of the SUEZ software application.

FIG. 12 show a flowchart in accordance with one embodiment of the invention. The following discussion outlines pseudo to implement the flowchart shown in FIG. 12 in accordance with one embodiment of the invention.

EnvironmentHandler (

UID: Numerical ID mapped to User-Name

User-Name: Users Authenticated SUES Environment name.

Hash-Perams: Colon separated parameters list: UniqueID: DivePath . . .

ChkHash: Bool; Does a hash/pointer already exist?

CreateHash: Only Create Hash, don't mount drives, etc. . .

GetPointer: Request a pointer to the current users hash.

InitEnv: Create a new environment.

DestructHash, Destroy current environment.

(The Hash is % UID%:% VIRTUAL-DRIVE-LETTER%, where the virtual-drive-letter is collected from the win32check for available vol letters function)

Maintain Subscription to File System Filter Driver

If request to check for hash
   ChkHash( )
   if hash:pointer exist in user db and pointer is valid
     return 0
   else
     return 1

If request to create new hash
   if ChkHash( ) Does hasWpointer exist?-ifyes . . .
   return an err message "A Job Object Environment already exists"
   exit
   else
   GenerateHash //Create a unique hash using authenticated UID as seed
   return hash
   MmapHash //Place hash in memory
   return pointer
   Appenduserprofile //Concatenate the authenticated users profile, in the user data base, with the newly generated hash/pointer (UID: USER-NAME: PASS WD becomes UID: USER-NAME:PASS WD: %HASH%: %POINTER)
   return pointer If request to create new environment
   if ChkHash( )//Does haswpointer exist?
   return an err message "A Job Object Environment already exists"
   exit
   else if ChkVol( )// See if the virtual disk indicated in the UID hash is mounted;
   return error message "A volume is already mounted for this environment"
   exit
   else
   LoadDriver Set
   if failure
   return error message "File System Driver failed to load"
   call 'Destruct Environment'
   !Open handle to File System Filter Driver! 'Subscribe'
   GetAvailableDriveLetter
   if success
   Appendprofile Concatenate the authenticated users profile, in the user data base, with the returned drive letter (UID: USER-NAME:PASSWD becomes UID: USER-NAME: PASS WD: DRIVELETTER:)
   else
   return error message "Cant get volume map"
   exit AppendUserProfile Concatenate the authenticated usersprofile, in the jlut (txt) data base, with the newly generated hash/pointer (UID: USER-NAME:PASSWD: DRIVELETTER becomes

UID: USER-NAME: PASS WD: DRIVELETTER: : %POINTER%)

return pointer

Mount(GetVolName)//Mount the loopback FS using VolName/Label if volume is successfully mounted
   return 0
else
   return error message "Mount Volume failed"
   Destruct Environment exit If request to destroy environment
   if ChkHash( ) Does hasWpointer exist?
   if ChkVol( ) See if the virtual disk indicated in the UID hash is mounted;
   UnMount( )
   if volume is successfully unmounted
     return 0
   else
     return error message "Un-mount Volume failed"
     exit
   else
   return error message "No volume mounted for this environment" UnloadHash Remove the hash from memory
   If fails
     Return error message
   RmPointer Remove the volume:pointer string appended to the users profile (in the Jlat [.txt file] data base . . . )
   if fails
     return error message
   UnloadDriver Set
   if fails
     return error message else
   return error message "No Environment Exists"

Figure 13:
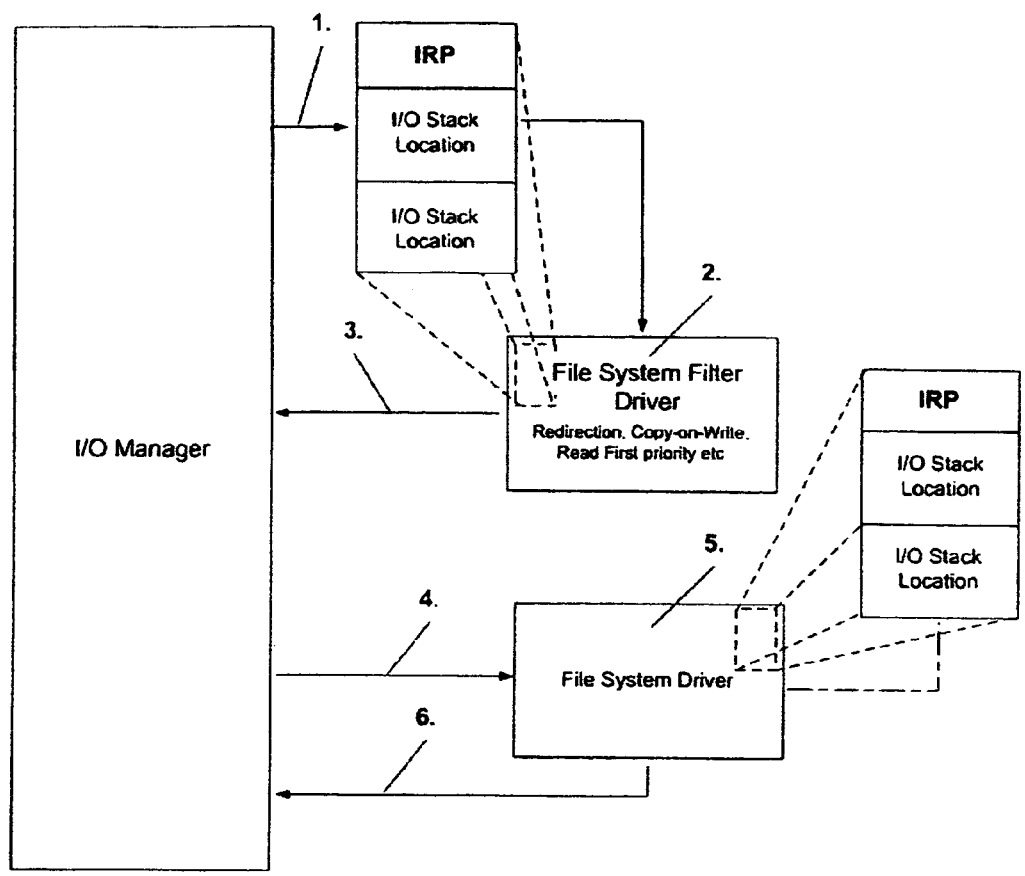
FIG. 13 is a block diagram of the relationship of the File System Filter Driver to the operating system and its native file system driver.

If request to GetHashPointer if ChkHash( )
   return pointer
else
   return error exit FIG. 13 show a flowchart in accordance with one embodiment of the invention.

In step 1, the I/O manager creates an IRP for any given operation needing file system I/O processing. It fills the stack location corresponding to the driver that is at the top of the layer (in this case our File System Filter). In step 2, the File System Filter, on receiving an IRP, does any processing needed to fulfill the current SUEZ filter rules. In step 3, the File System Filter then returns the IRP to the I/O manager, copying its stack to the lower drivers stack location. In step 4, the I/O manager passes the IRP on to the driver below it in the layer order (in this case, the File System Driver). In step 5, the lower level driver now processes the IRP; using its own stack.

In step 6, the lower level driver (FSD) returns the IRP back to the I/O manager. The I/O manager then releases any resource allocated to the IRP.

Figure 14:
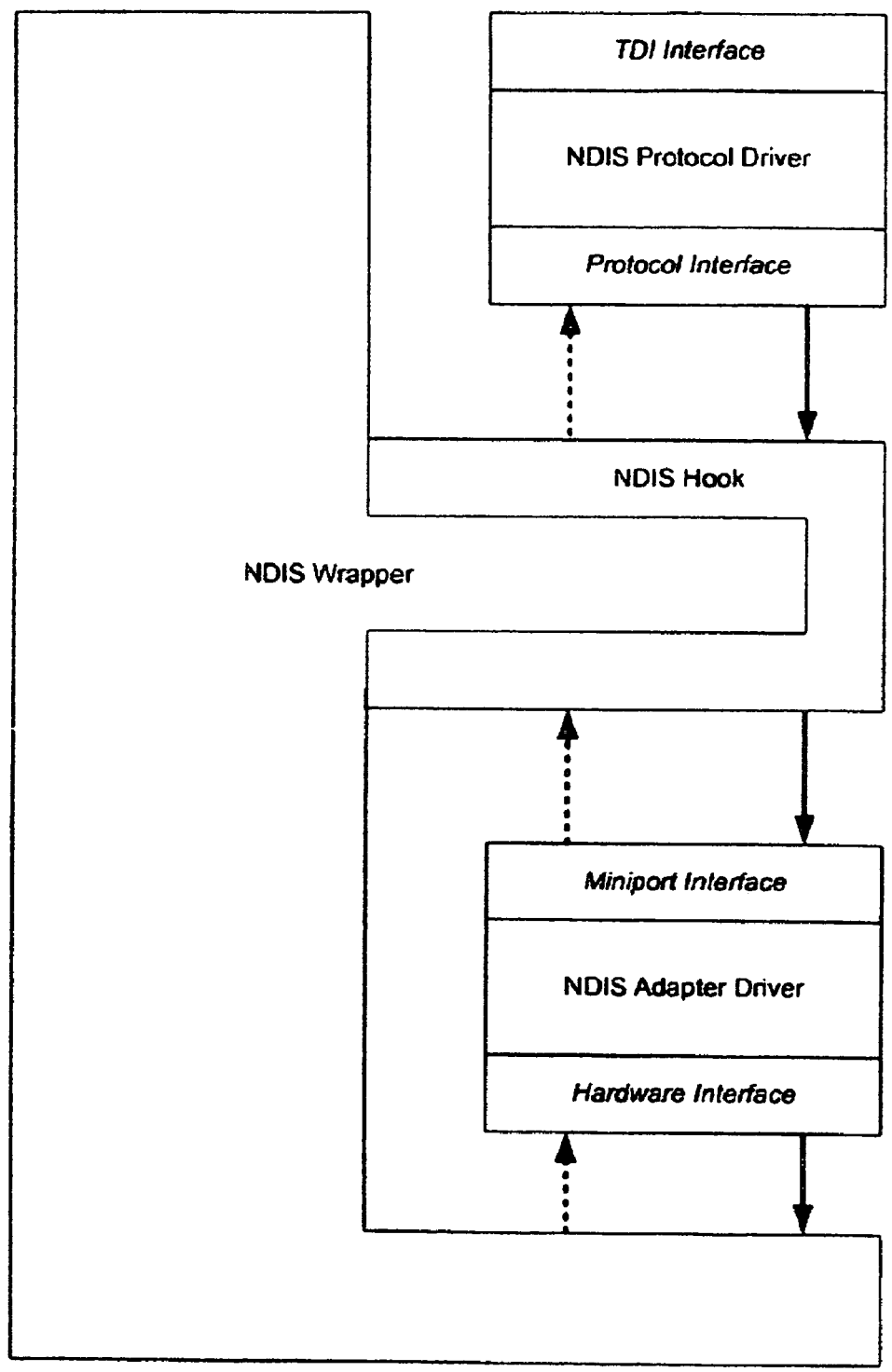
FIG. 14 is a block diagram of the relationship of the NDIS Hook driver to the operating system and its native NDIS driver.

FIG. 14 show a flowchart in accordance with one embodiment of the invention.

The following discussion outlines pseudo to implement the flowchart shown in FIG. 14 in accordance with one embodiment of the invention. In one embodiment of the invention, the NDIS Hook intercepts IP packets at the NDIS (Network Device Interface Specification) layer using a custom driver, for example, SUEZNDIS.VXD or SUEZNDIS.SYS and at the SPI (Service Provider Interface) layer using, for example, a SUEZNDIS.DLL. In one embodiment of the invention, each intercepted packet is checked against the filtering rules that define what kind of traffic is allowed to pass. Allowed incoming packets are forwarded to the TCP/IP stack (not shown) and the networking applications (not shown). Similarly, allowed outgoing packets are sent out on the network interface. In one embodiment of the invention, the rules describing the aforementioned filtration are provided as meta data.

Figure 15:
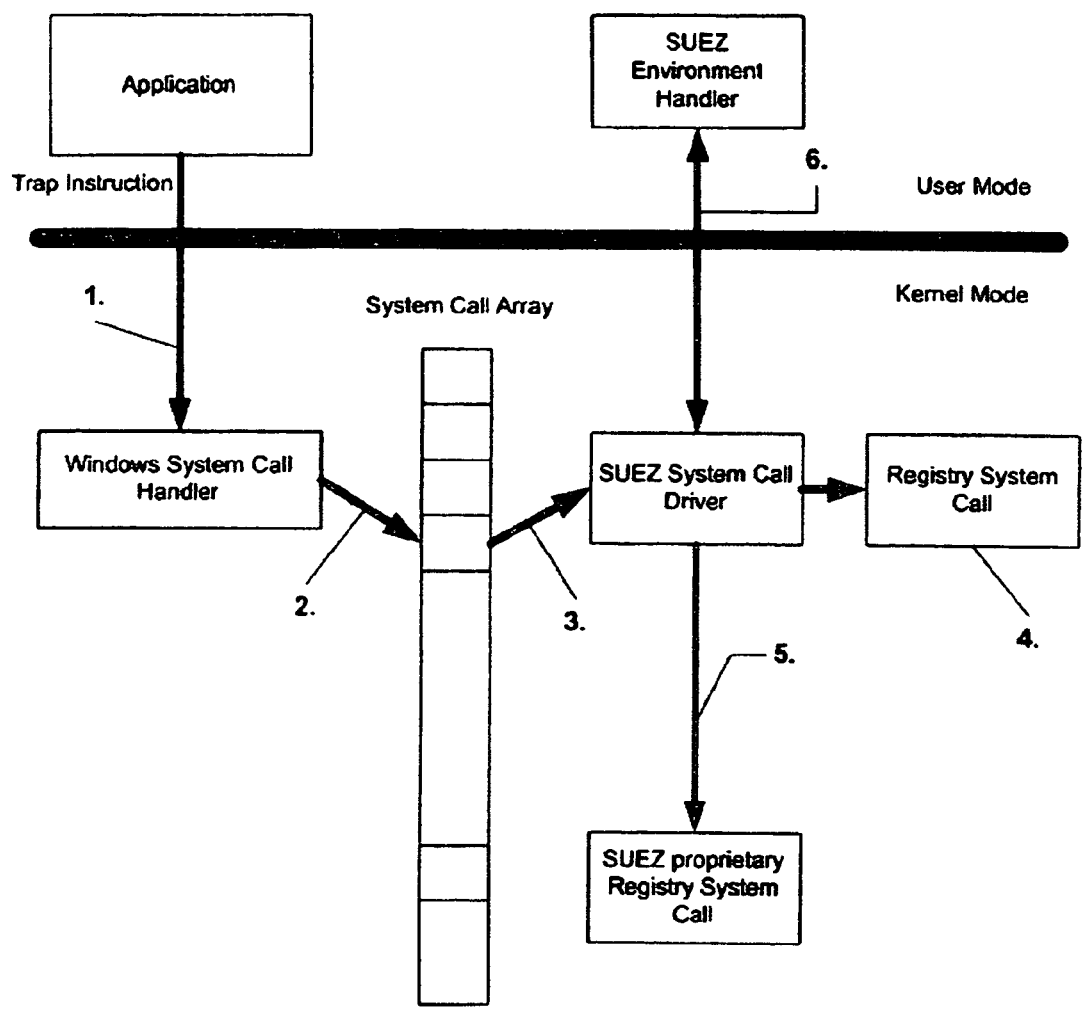
FIG. 15 is a block diagram of the relationship of the System Call Hook to the operating system and its native system call handler.

FIG. 15 show a flowchart in accordance with one embodiment of the invention. The following discussion outlines pseudo to implement the flowchart shown in FIG. 15 in accordance with one embodiment of the invention. In step 1, the application executes a registry related system call. In step 2, the WINDOWS® system call handler looks up the kernel function corresponding to the system call, which SUEZ has replaced with its own function. In step 3, SUEZ calls its system call hook function. In step 4, SUEZ invokes the original handler. In step 5, SUEZ invokes its environment specific registry handler. In step 6, the environment handler prescribes filter metadata, and periodically obtains log statistics.

System Overview

Figure 16:
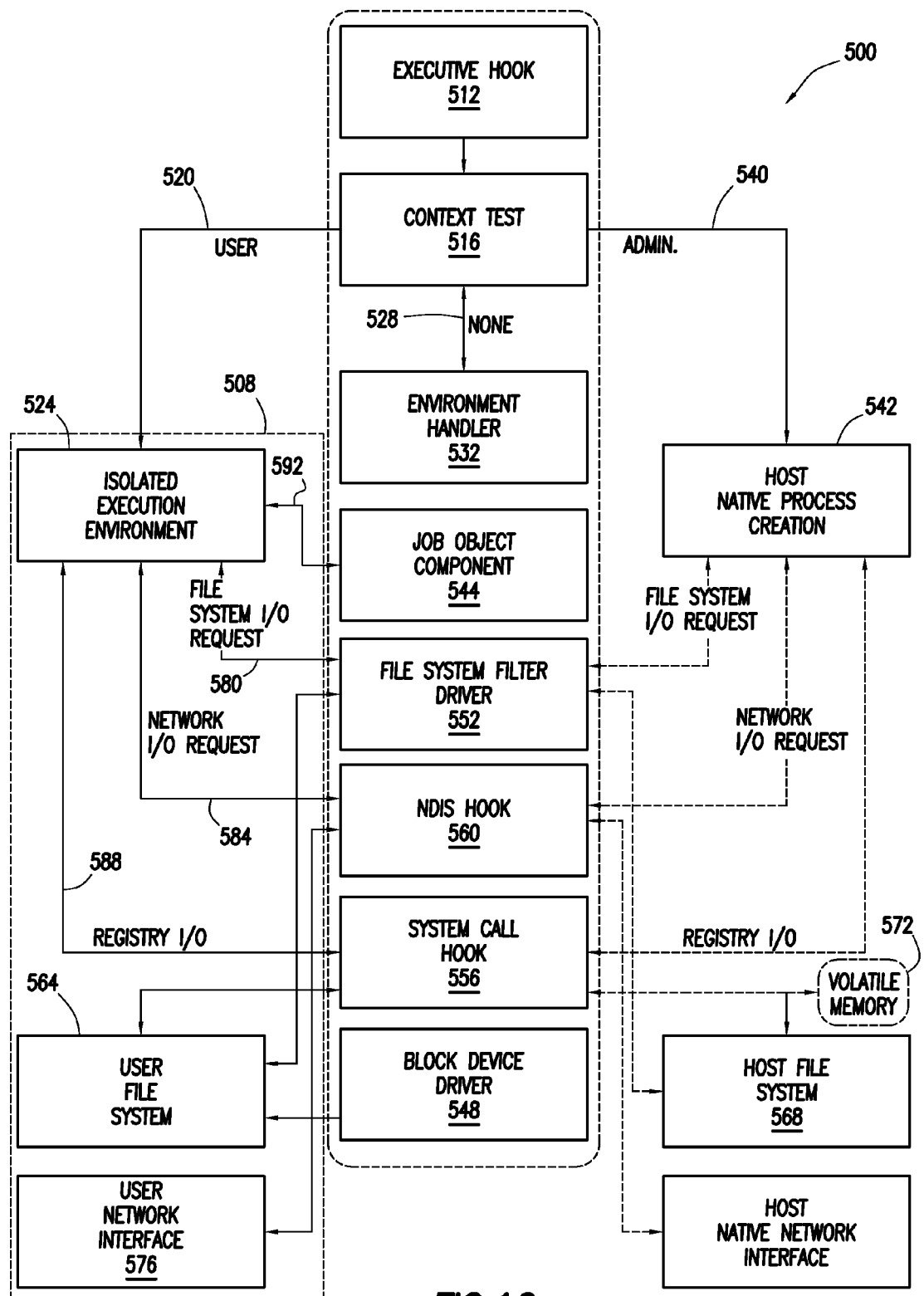
FIG. 16 is a high level flow chart diagramming the major components the isolated User environment of the present invention.

Turning now to FIG. 16 there is provided a schematic illustration of the system environment wherein the described software system is operating, referred to as system 500 and representing a preferred embodiment of the present invention upon installation and initialization on the Host computer system. The system 500 includes seven principal components which comprise the preferred embodiment of an Isolated User Environment (IUE) software:

a) The Execution Hook component, which intercepts all system calls to load an executable image and tests the execution requests for an assigned User context. This testing allows credential based assignment of processes to an alternate method of process creation to that native to the Host computer system. Additionally, the Execution Hook is the triggering mechanism for the initiation of new Isolated User Environments.

b) The Job object module, which provides an alternative process creation mechanism that allows the IUE to create a job with specific security descriptors and then assign User processes and their children to this job for creation; this assignment facilitates starting User processes in a restricted state, allowing the Environment handler to prescribe granular control over the credentials, memory allocation, IPC and general functionality assigned any User processes. All processes assigned to a User job are definable by a context representing this association and are effectively jailed within the file system namespace allocated to User's isolated User environment by this context due to its being honored by the complementary software components of the present system.

c) The System Call Hook, which provides a virtual registry, private to the isolated User environment, by selectively redirecting registry calls associated with a Users context to a virtual registry within the isolated User environment. The IUE System Call Hook has its interception functions run in lieu of the Host computer systems original system call functions simply by inserting pointers to the IUE replacement functions within the Windows system call array. After the IUE System Call Hook has examined the parameters an application, requesting registry I/O, passed to a system call, it tests these parameters against a set of filter rules prescribed by the environment handler to determine whether the I/O must be redirected to the isolated User instance of the Windows registry. If the original system call request is not of User context, the IUE System Call hook invokes the Host system call it replaced. When control returns to the IUE System Call Hook from the Host system call, the IUE System Call functions can optionally still examine the return status and pass control to the requesting application. FIG. 15 demonstrates this process. System call indexes can change between different releases of Windows, but the method the preferred embodiment uses to determine indexes is version-independent.

d) The Block device driver, which is a file system driver component for mounting and un-mounting a flat file as a block device. This facilitate the isolation of the User's isolated file system from the Host file system. In the preferred embodiment this driver is called upon, at IUE initialization, to mount a specific isolated User file system by the environment handler. The call for destruction of an isolated User environment results in a subsequent call from the environment handler to unmount the isolated User file system.

e) The File System Filter Driver (FSFD), which facilitates presenting the file system namespace of an IUE to its associated User and User context processes as a combination of the Host computers file system namespace and that of the Users isolated file system. Control of what objects from the Host computers file system are included in this merger of namespaces is controlled by User credentials and their associated metadata, prescribed by the environment handler. The FSFD intercepts requests targeted at a file system or another file system filter driver. By intercepting the request before it reaches its intended target, the FSFD extends or replace functionality provided by the original target of the request. All I/O requests made by any process with User context are proxied, allowing processing of all such I/O (read|write|modify|delete|copy, etc) to be performed in lieu of normal processing. This includes the transparent redirection, of select file system requests, to the User's isolated file system.

f) The NDIS driver, which isolates User context requests for network connectivity to that Users IUE. To facilitate isolating User network interactions to the IUE, the preferred embodiment exports one or more virtual adapters, bound to Users IUE, to which overlying protocols can bind. To a protocol driver, a virtual adapter exported by the intermediate driver appears to be a physical NIC. This allows an IUE to be bound to a MAC and IP address removed from that of the Host computer system. Additionally, the NDIS hook intercepts IP packets at the Windows NDIS (Network Device Interface Specification) layer; each packet is checked against the filtering rules that define what kind of traffic is allowed to pass. Allowed incoming packets are forwarded to the TCP/IP stack and the networking applications. Similarly, allowed outgoing packets are sent out on the network interface.

g) The Environment handler component, is responsible for creating and destructing User specific IUE's as needed, however, to facilitate tying all described IUE software components together, the Environment Handler provides environment management services for all the components of the preferred embodiment by revealing an administrative configuration interface to system administrators. It facilitates the definition of the rules and general configuration data that defines the operation of the present system. User authentication and credentials for all software components, prescribing filter metadata and periodically obtaining log statistics or metrics from all IUE software components are all under the environment handlers jurisdiction. Additionally, the environment handler operates as a proxy to facilitate interconnection of all components of the IUE, tying all the described components into a single source for authentication, filter and parameter metadata, credential discovery, system state and general configuration.

FIG. 16 presents a high level flow diagram of the IUE components operation. The preferred embodiment providing isolation of all User execution and I/O operation from the Host computer system 500. The Execution Hook component intercepts system calls requesting process execution. All such calls are tested for a User context previously assigned by the IUE software. If a user context is present, the environment handler is queried to determine how to operate on the current request. If the request is determined to be in the context of a User with a currently initialized IUE, then the process is passed to the existing User associated job object for creation. If no User context is present in association with a request for process creation, the environment handler is interrogated for authentication. Upon return of authentication, a context is assigned reflecting the credentials of the authenticated operator. If the User has administrative credentials, an administrative context is set and the request for process execution is passed to the Host systems native process creation mechanism. If the User credential is not privileged, the environment handler initiates the creation of a IUE to which to bind the User. This Isolated User Environment initialization consists of the creation of a Job Object, with credentials specific to User (as prescribed by the environment handler during its creation of the User Job Object), to which all User processes can be assigned for creation and the mounting of a flat file as a block device by the Block Device Driver providing an isolated User file system, additionally, the initialization of the File System Filter Driver (FSFD), System Call Hook and NDIS drivers, having been prescribed by the Environment Handler appropriate filtering metadata reflecting the credentials of the User for which the environment is being created and finally, any pre-processing specifically required for User or generally required by the software are processed by the Environment handler.

Once an IUE has been initialized for User by the Environment Handler, all subsequent process creation requests are assigned to the User Job Object component and loaded suspended. Once assigned, an alternative process creation mechanism defines specific memory restrictions and security descriptors binding all User processes and their children, then the process is released from its suspended state for execution in the Isolated Execution Environment (IEE) created by the Job Object.

Once User processes are restricted to the Isolated Execution Environment (IEE), binding them within the User's IUE, they are unable to see objects outside their IUE, as defined by the credentials prescribed by the environment handler. Effectively, they operate as normal, though the file system namespace and process object namespace revealed to them by FSFD and IEE is restricted to the IUE namespace or some subset of the Host computer systems namespace in combination with the that of the Users IUE.

User processes making I/O requests targeted at a file system or another file system filter driver are intercepted by the FSFD for examination and potential modification. By intercepting the request before it reaches its intended target, the filter driver extends or replace functionality provided by the original target of the request. All I/O requests made by any process owned by User are proxied, allowing processing of all such I/O (read|write|modify|delete|copy, etc) to be performed in lieu of normal processing. This includes the transparent redirection of select file system requests to User's isolated User file system, as well controlling object visibility or access by object type, credentials, location, etc. By mirroring the Host computers native file system hierarchy and implementing granular FSFD redirection filtering rules, the preferred embodiment can create a merged view of the Host computer systems process object and file system namespace for exposure to User processes. An example of this would be to allow User access to particular directories on the Host file system, all other directories being mirrors of the Host file system but resident on the isolated User file system. Restarting the Host computer systems shell under the Users context upon initiation of the IUE results in the graphical presentation of the User namespace presented by the computer system, such as the desktop, file explorer etc, to be a reflection of the users namespace merged with whatever objects have been configured for revelation to the User by the FSFD.

An application's configuration data is crucial to its proper function. The windows registry provides programs an interface to system and software configuration data. To facilitate this functionality, while still abstracting the Host computer system from processes belonging to an IUE, the preferred embodiment implements a System Call Hook to intercept and filter registry I/O, protecting the Host computers configuration data. User processes making I/O requests to the Windows registry structure may be making calls to edit cells in volatile memory, thus the need for a redirection system in addition to the FSFD. Such system call requests are tested for User context by the System Call Hook component and filtered based on rules prescribed by the Environment Handler. Because the Windows System Service functions are stored in a system service dispatch table within the kernel, the IUE System Call Hook driver is able to hook a system service by saving the address of a function from Host's native array and replacing the array entry with the address of the IUE hook function. Once the IUE is installed on a system 500, any invocations of the hooked system service get diverted to the IUE drivers function. Here the call is examined for an association to a User context. If the call is found to originate from a User context process it may be modified and the registry request diverted to a registry within the isolated User environment. The IUE registry may be a mirror of the host systems registry hive or some subset there of, optionally, a read-first operation can be performed that looks to the User registry for requested key's before examining the Host computer systems native registry for the requested I/O.

Commonly, User processes will request connectivity to an attached network, such as the Internet. To isolate such interactions to the IUE, this embodiment of the present invention utilizes an NDIS driver that exports a virtual adapters specific to the Users IUE. This allows an IUE to be bound to a MAC and IP address removed from that of the Host computer system. Additionally, the NDIS hook intercepts IP packets at the Windows NDIS (Network Device Interface Specification) layer; each packet is checked against the filtering rules that define what kind of traffic is allowed to pass. Allowed incoming packets are forwarded to the TCP/IP stack and the networking applications. Similarly, allowed outgoing packets are sent out on the network interface.

Use Case

The following Use Case(s) are used primarily to capture the high level user-functional requirements of the SUEZ system. This section provides a description of each section in the use case template.

Actor: An actor is a person or other entity external to the software system being specified who interacts with the system and performs use cases to accomplish tasks. Different actors often correspond to different user classes, or roles, identified from the customer community that will use the product.

Description: A brief description of the reason for and outcome of this use case, or a high-level description of the sequence of actions and the outcome of executing the use case.

Preconditions: List any activities that must take place, or any conditions that must be true, before the use case can be started.

Postconditions: Describe the state of the system at the conclusion of the use case execution.

Normal Case Provides a detailed description of the user actions and system responses that will take place during execution of the use case under normal, expected conditions. This dialog sequence will ultimately lead to accomplishing the goal stated in the use case name and description.

Alternative Case Documents other, legitimate usage scenarios that can take place within this use case. States the alternative flow, and describes any differences in the sequence of steps that take place.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

The invention claimed is:

1. A method for securing a computer system, comprising:
   monitoring an operating system executing on a processor in the computer system;
   trapping, in response to the monitoring, a process system call to execute a program, wherein the process system call originated in a host executing in the computer system;
   responsive to the trapping:
   determining whether the process system call is associated with a user context;
   in response to determining that there is no user context associated with the process system call creating the user context for a user that initiated the process system call, creating an isolated user environment (IUE) in the computer system, and binding the user context to the IUE, wherein, after the binding, subsequent requests associated with the user context are restricted by the IUE,
   wherein creating the IUE comprises:
   allocating memory and persistent storage for the IUE in the computer system,
   creating a user job object associated with the user and comprising security descriptors, wherein the user job object is associated with the IUE, wherein user processes associated with the user job object are restricted by the IUE based on the security descriptors,
   exporting a virtual adaptor from the IUE to the host, wherein the virtual adaptor is associated with a Media Access Control (MAC) address and an Internet Protocol (IP) address; and
   wherein the IUE is associated with:
   a file system filter driver (FSFD) configured to redirect Input/Output (I/O) calls originating from the IUE to the persistent storage, and
   a network interface/NDIS hook component configured to control, using the virtual adapter, network traffic originating from the IUE to network devices external to the host and destined for the IUE from network devices external to the host;
   after creating the IUE, loading an executable image corresponding to the program into the IUE; and
   executing the program using the executable image in the IUE using the processor, wherein the IUE enables a user to provide input to the program during execution, wherein a user process executing the program is associated with the user job object, wherein execution of the program is restricted based in part on the user job object, and wherein during execution of the program in the IUE at least one packet is sent, using the virtual adaptor, from the IUE to a network device external to the host.

2. The method of claim 1, further comprising:
   responsive to the executing, issuing an I/O call from the IUE to a file system of the host; and
   redirecting, by the FSFD, the I/O call to the persistent storage, wherein the persistent storage comprises a file system of the IUE.

3. The method of claim 2, wherein a hierarchy of the file system of the IUE mirrors a hierarchy of the file system of the host.

4. The method of claim 2, wherein the FSFD is configured to limit the portions of the file system of the host which processes executing in the IUE may access.

5. The method of claim 1, further comprising:
   responsive to the executing, issuing an I/O call from the IUE to a registry of the host; and
   redirecting, by a system call hook component, the I/O call to the persistent storage, which includes a registry of the IUE.

6. The method of claim 5, wherein the registry of the IUE is a mirror of the registry of the host.

7. The method of claim 5, wherein the system call hook component is configured to query the registry of the IUE prior to querying the registry of the host when locating a registry key.

8. The method of claim 1, further comprising:
   responsive to the executing, storing data in the persistent storage;
   after executing the process system call, closing the IUE; and
   responsive to closing the IUE, terminating all processes executing the IUE, deallocating the memory and unmounting the persistent storage.

9. The method of claim 8, further comprising:
   creating a new IUE after closing the IUE, wherein the data in the persistent storage is accessible through the new IUE.

10. The method of claim 1, wherein the process system call is associated with the user, wherein the persistent storage comprises a file system for the user and wherein the IUE comprises a file system block device driver component configured to mount and unmount the file system for the user.

11. The method of claim 10, wherein the file system for the user is stored as a flat file in the persistent storage after the IUE is closed.

12. The method of claim 1, wherein the process system call corresponds to a call to open a web browser and access a website external to the host via the web browser.

13. The method of claim 1, wherein the host is associated with a first TCP/IP stack and the IUE is associated with a second TCP/IP stack, wherein the first TCP/IP stack is distinct from the second TCP/IP stack.

14. The method of claim 1, wherein the process system call is associated with the user job object and wherein job objects not associated with the IUE are hidden from the restricted process.

15. The method of claim 1, wherein the IP address associated with the virtual adapter is distinct from an IP address associated with a physical network interface connected to the host.

* * * * *